(12) United States Patent
Savian

(10) Patent No.: US 10,093,421 B2
(45) Date of Patent: Oct. 9, 2018

(54) DUAL MODULAR LAVATORY WITH ALCOVES

(71) Applicant: C&D ZODIAC, INC., Huntington Beach, CA (US)

(72) Inventor: Scott Savian, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 234 days.

(21) Appl. No.: 15/257,618

(22) Filed: Sep. 6, 2016

(65) Prior Publication Data

US 2017/0001728 A1    Jan. 5, 2017

Related U.S. Application Data

(60) Division of application No. 14/184,653, filed on Feb. 19, 2014, now Pat. No. 9,527,591, which is a
(Continued)

(51) Int. Cl.
*B64D 11/02* (2006.01)
*A47K 4/00* (2006.01)
(Continued)

(52) U.S. Cl.
CPC .............. *B64D 11/02* (2013.01); *A47K 4/00* (2013.01); *B64D 11/003* (2013.01);
(Continued)

(58) Field of Classification Search
CPC .... B64D 11/02; B64D 2011/0046; A47K 4/00
See application file for complete search history.

(56) References Cited

U.S. PATENT DOCUMENTS 3,594,037 A    7/1971    Sherman
4,477,934 A    10/1984    Salminen
(Continued)

FOREIGN PATENT DOCUMENTS

EP    0290477    11/1988
EP    0349762    1/1990
(Continued)

OTHER PUBLICATIONS

PCT/US2013/025974 International Search Report & Written Opinion dated Apr. 19, 2013.
(Continued)

*Primary Examiner* — Nicholas McFall
(74) *Attorney, Agent, or Firm* — Jeffer Mangels Butler & Mitchell LLP; Brennan C. Swain, Esq.

(57) ABSTRACT

A modular lavatory monument assembly configured to be positioned in the interior of an aircraft. The modular lavatory monument assembly includes first, second, third and fourth walls that cooperate to form an outer shell that defines a lavatory interior. The fourth wall includes an alcove extending outwardly therefrom. The assembly also includes a sink module positioned in the alcove, a mirror module positioned above the sink module in the alcove, and a door positioned on one of the second or third walls.

18 Claims, 26 Drawing Sheets

Related U.S. Application Data continuation-in-part of application No. 13/765,612, filed on Feb. 12, 2013, now Pat. No. 9,045,230.

(60) Provisional application No. 61/766,665, filed on Feb. 19, 2013, provisional application No. 61/842,292, filed on Jul. 2, 2013, provisional application No. 61/858,073, filed on Jul. 24, 2013, provisional application No. 61/906,794, filed on Nov. 20, 2013, provisional application No. 61/598,762, filed on Feb. 14, 2012.

(51) Int. Cl.
*B64D 11/00* (2006.01)
*B64D 11/06* (2006.01)

(52) U.S. Cl.
CPC ...... *B64D 11/0641* (2014.12); *B64D 11/0691* (2014.12); *B64D 2011/0046* (2013.01); *B64D 2231/025* (2013.01); *Y10T 29/49826* (2015.01)

(56) References Cited

U.S. PATENT DOCUMENTS

| | | | |
|---|---|---|---|
| 4,884,767 A | 12/1989 | Shibata | |
| 4,928,312 A * | 5/1990 | Hill | H04R 1/025 181/174 |
| 6,079,669 A * | 6/2000 | Hanay | B64D 11/02 244/118.5 |
| D487,137 S | 2/2004 | Itakura | |
| 7,222,820 B2 | 5/2007 | Wentland | |
| 7,284,287 B2 | 10/2007 | Cooper | |
| 7,299,511 B2 | 11/2007 | Quan | |
| 7,549,606 B2 | 6/2009 | Quan | |
| 7,886,603 B2 | 1/2011 | Cooper | |
| 8,602,354 B2 | 12/2013 | Sutthoff et al. | |
| 2002/0062521 A1 | 5/2002 | Itakura | |
| 2004/0123381 A1 | 7/2004 | Kitade | |
| 2004/0163170 A1* | 8/2004 | Cooper | B64D 11/02 4/664 |
| 2004/0227034 A1 | 11/2004 | Wentland | |
| 2005/0116099 A1 | 6/2005 | Pho | |
| 2007/0233433 A1 | 10/2007 | Lee | |
| 2008/0265092 A1* | 10/2008 | Cooper | B64D 11/02 244/118.5 |
| 2011/0011979 A1 | 1/2011 | Weil et al. | |
| 2012/0012706 A1 | 1/2012 | Ehlers | |
| 2013/0001359 A1 | 1/2013 | Schliwa | |
| 2013/0206904 A1 | 8/2013 | Gee | |
| 2014/0097294 A1 | 4/2014 | Boren | |
| 2014/0124622 A1 | 5/2014 | Boren | |
| 2014/0145477 A1 | 5/2014 | Ersan | |

FOREIGN PATENT DOCUMENTS

| | | |
|---|---|---|
| EP | 0867365 | 9/1998 |
| EP | 1338508 | 8/2003 |
| EP | 1648767 | 4/2006 |
| EP | 2289798 | 3/2011 |
| EP | 2907753 | 8/2015 |
| WO | 2009118242 | 10/2009 |

OTHER PUBLICATIONS

PCT/US2014/017227 International Search Report & Written Opinion dated Jun. 11, 2014.
PCT/US2015/051520 International Search Report & Written Opinion dated Dec. 15, 2015.
EP13748621.3 Supplemental Search Report dated Dec. 15, 2015.
EP14754353.2 Search Report dated Mar. 10, 2017.

\* cited by examiner

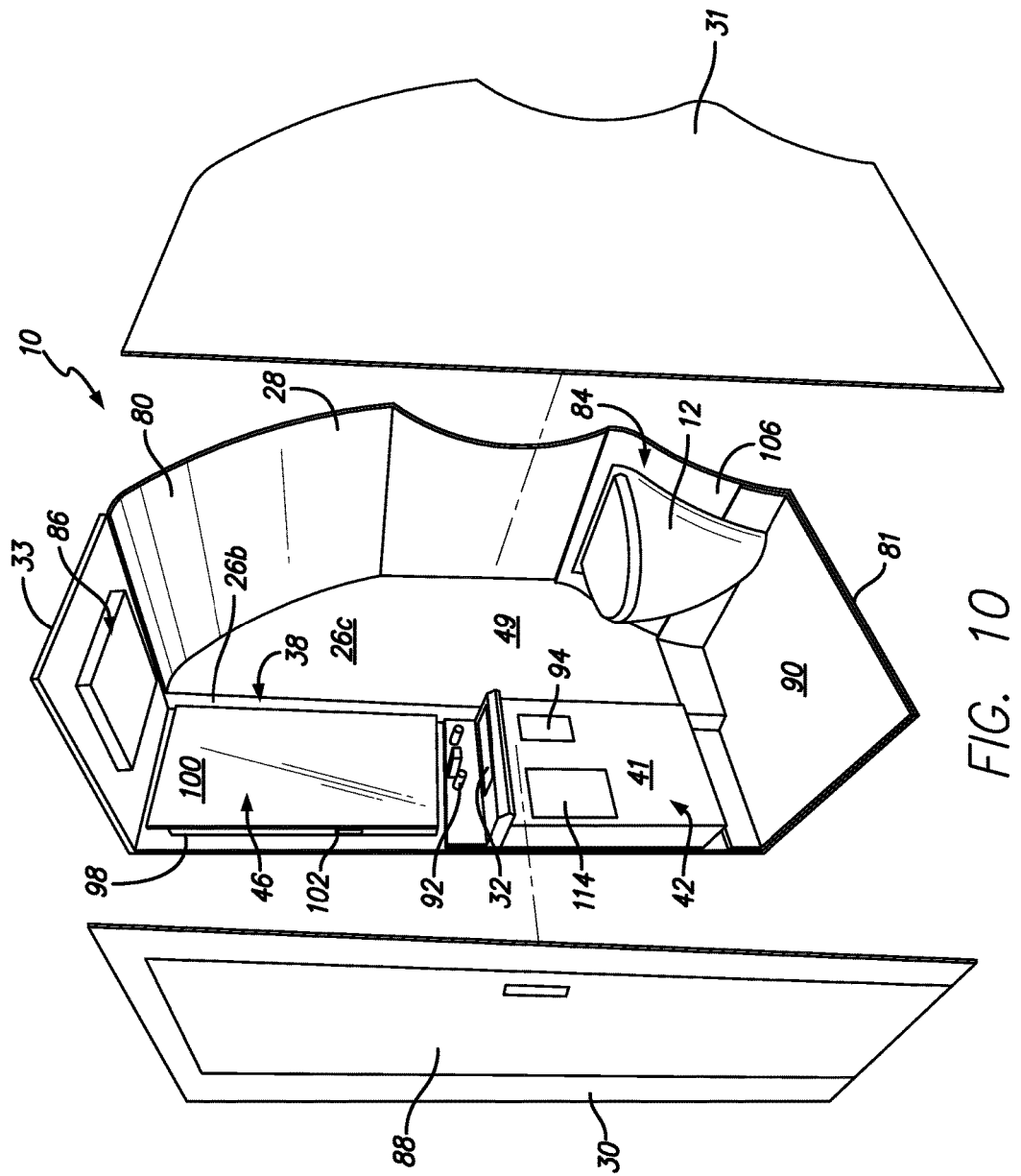

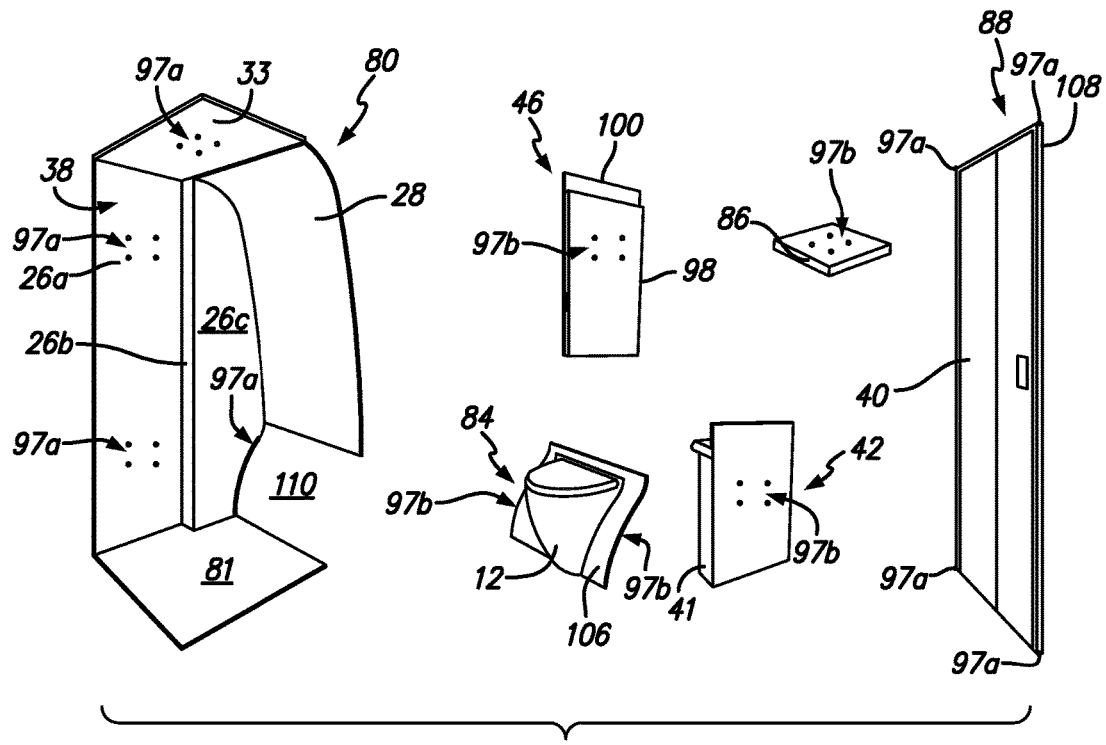
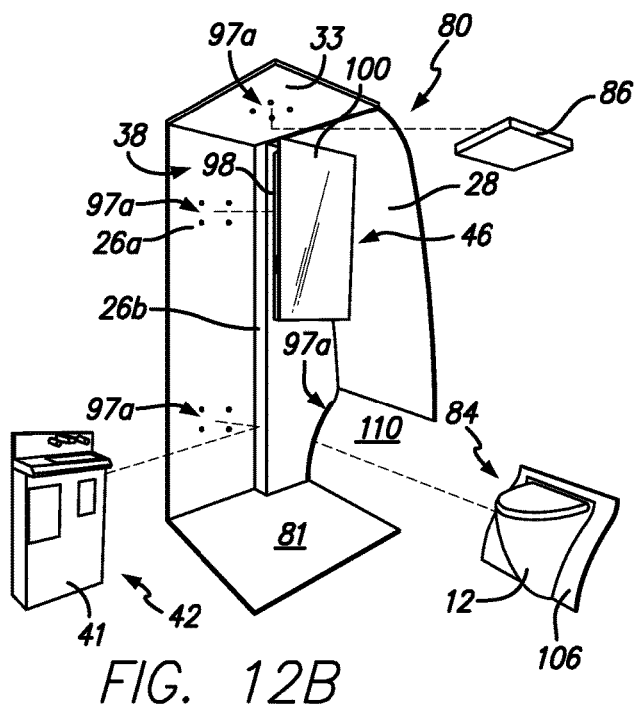

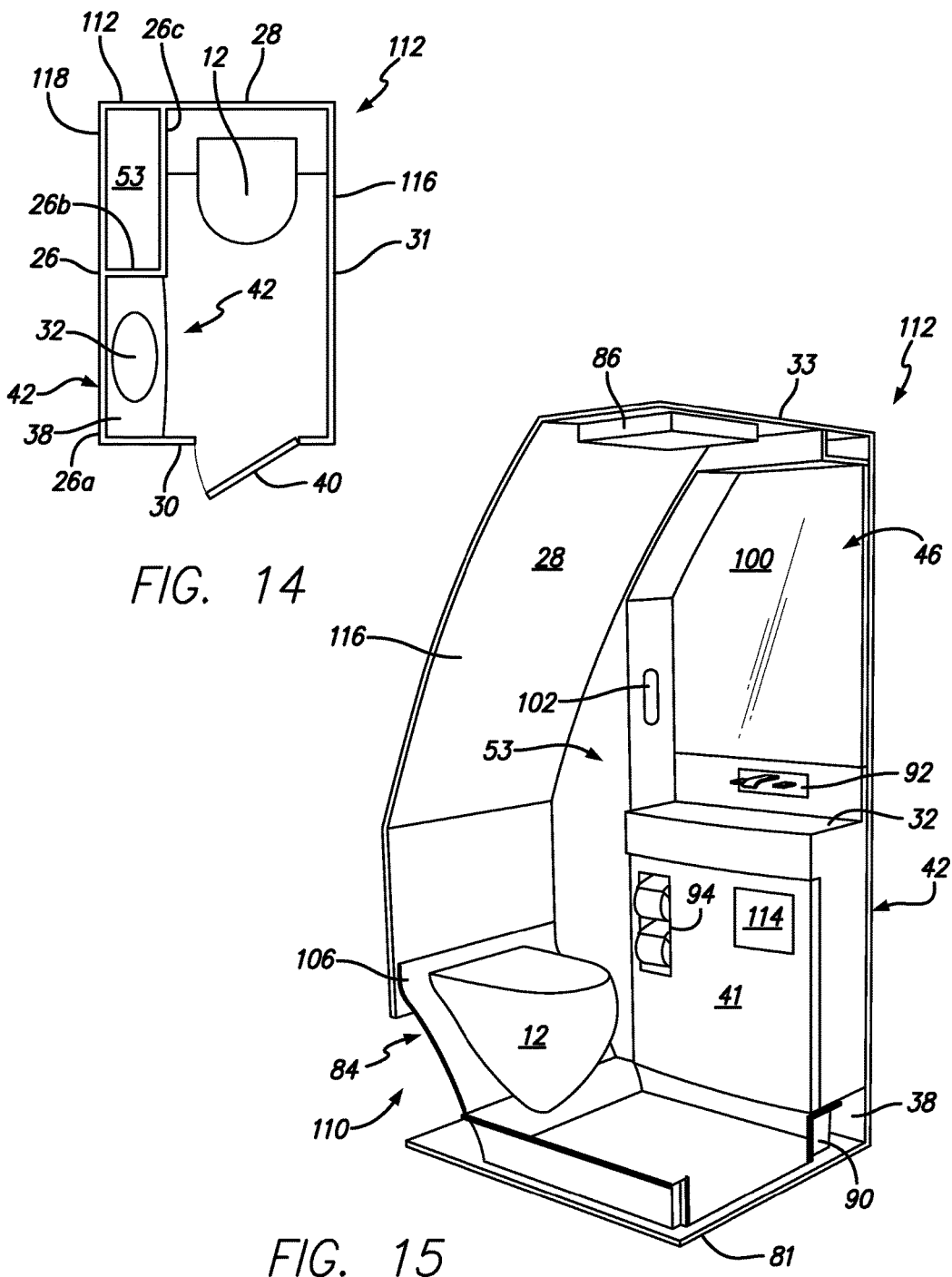

DUAL MODULAR LAVATORY WITH ALCOVES

CROSS REFERENCE TO RELATED APPLICATIONS

This application is a divisional of U.S. patent application Ser. No. 14/184,653, filed Feb. 19, 2014, which is a continuation-in-part of U.S. patent application Ser. No. 13/765,612, filed Feb. 12, 2013, now U.S. Pat. No. 9,045,230 issued Jun. 2, 2015, which claims the benefit of U.S. Provisional Application No. 61/598,762, filed Feb. 14, 2012, which are each incorporated by reference herein in their entireties. U.S. patent application Ser. No. 14/184,653 also claims the benefit of U.S. Provisional Application No. 61/766,665, filed Feb. 19, 2013, U.S. Provisional Application No. 61/842,292, filed Jul. 2, 2013, U.S. Provisional Application No. 61/858,073, filed Jul. 24, 2013, and U.S. Provisional Application No. 61/906,794, filed Nov. 20, 2013, which are all incorporated by reference herein in their entireties.

FIELD OF THE INVENTION

The present invention relates generally to aircraft lavatories and more particularly to a modular aircraft lavatory with an alcove.

BACKGROUND OF THE INVENTION

Commercial aircraft, such as the Airbus A320 or Boeing 737, are typically constructed from modular components, the size, weight and construction of which are dictated by many considerations, including fuselage dimensions, aesthetic and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew.

A conventional lavatory has a rectangular footprint, a toilet, and a sink. It usually also has four composite panel walls that may be molded to fit the curvature of the plane, and a ceiling with built in lighting. The lavatory monument is secured to the aircraft via various tie-rods and brackets, and is designed to independently conform to FAA loading standards. Lavatories have been a standard monument on commercial aircraft for decades. Lavatory monuments are typically constructed as a unit and then installed in an aircraft. After use, the conventional lavatory monument is then removed as a unit from the aircraft and replaced.

SUMMARY OF THE PREFERRED EMBODIMENTS

In accordance with an aspect of the present invention there is provided a modular lavatory monument assembly that includes first, second, third and fourth walls that cooperate to form an outer shell that defines a lavatory interior. The fourth wall includes an alcove extending outwardly therefrom. The assembly also includes a sink module positioned in the alcove, a mirror module positioned above the sink module in the alcove, and a door positioned on one of the second or third walls. In a preferred embodiment, the fourth wall includes first, second and third portions. The first portion is connected to the second wall, the third portion is connected to the first wall and the second portion extends between and is not parallel with the first and third portions. The alcove is defined by the first and second portions of the fourth wall and part of the first wall. Preferably, the outer shell includes a floor and the alcove extends from the floor to the top of the fourth wall. The outer shell preferably includes a ceiling and the alcove extends from the floor to the ceiling. In a preferred embodiment, when the modular lavatory monument assembly is placed proximate an aircraft exit door that defines an aircraft exit path the alcove extends into the aircraft exit path and an assist space is defined between the second portion of the fourth wall and the exit door.

In a preferred embodiment, the modular lavatory monument assembly also includes a toilet module positioned in the lavatory interior and secured to at least one of the first, third or fourth walls. The sink module preferably includes a sink cabinet, a faucet, a sink bowl, a counter, a waste compartment, a water supply system, a toilet paper dispensing unit and a set of mounting components on the sink cabinet that are removably mounted to associated mounting components in the alcove. The mirror module preferably includes a mirror cabinet, a mirror, a paper towel dispensing unit, a flight attendant call button, and a set of mounting components on the mirror cabinet that are removably mounted to associated mounting components in the alcove. The toilet module preferably includes a shroud, a toilet bowl, a seat and a lid. The shroud includes mounting components thereon that are removably secured to mounting components on the first, third or fourth walls. In a preferred embodiment, the modular lavatory monument assembly also includes a ceiling module positioned in the lavatory interior that includes a housing, an oxygen generator, at least one oxygen mask, a speaker, a smoke detector and a set of mounting components on the housing that are removably mounted to associated mounting components on the outer shell.

In a preferred embodiment, the outer shell further includes a storage compartment positioned adjacent the alcove that is at least partially defined by an outer surface of the second portion of the fourth wall and an outer surface of the third portion of the fourth wall. Preferably, the storage compartment is further defined by a first exterior wall that is connected to the first wall and a second exterior wall that is connected to the first portion of the fourth wall. The storage compartment is further defined by a first exterior wall that is co-planar with the first wall and a second exterior wall that is co-planar with the first portion of the fourth wall.

In a preferred embodiment, the sink module, mirror module, toilet module and ceiling module are each removably secured to the outer shell independently, and each of the sink module, mirror module, toilet module and ceiling module can be removed from the outer shell without having to remove any other of the sink module, mirror module, toilet module or ceiling module.

In a preferred embodiment, the modular lavatory monument assembly is provided in combination with a business class seat shell, and the fourth wall of the outer shell defines a foot recess in an exterior surface thereof.

In accordance with another aspect of the present invention there is provided a modular lavatory monument assembly that includes first, second, third and fourth walls that cooperate to form an outer shell that defines a lavatory interior and a storage compartment that is defined by a first storage compartment wall extending inwardly from the fourth wall and a second storage compartment wall extending inwardly from the first wall. The first and second storage compartment walls are connected and an alcove is defined by the first storage compartment wall, the fourth wall and the second wall. The first storage compartment wall separates the alcove and the storage compartment. The assembly also includes a sink module positioned in the alcove, a mirror module positioned above the sink module in the alcove, and a door positioned on one of the second or third walls. In a preferred embodiment, the outer shell includes a floor and a ceiling, and the alcove and the storage compartment extend from the floor to the ceiling. Preferably, the modular lavatory monument assembly further includes a toilet module that includes a toilet and a shroud that extends between the second storage compartment wall and the third wall.

In accordance with another aspect of the present invention there is provided a modular dual lavatory monument assembly that includes first, second, third and fourth walls that cooperate to form an outer shell that defines an interior, and a fifth wall that divides the interior into first and second lavatories. The outer shell includes first and second alcoves that extend between the first and second walls to form an alcove strip. The assembly also includes a first sink module positioned in the first alcove, a first mirror module positioned above the first sink module in the first alcove, a first door positioned on one of the first or third walls, a second sink module positioned in the second alcove, a second mirror module positioned above the second sink module in the second alcove, and a second door positioned on one of the second or fourth walls. In a preferred embodiment, the fifth wall includes first, second and third portions. The first portion is connected to the first wall, the third portion is connected to the second wall, and the second portion extends between and is not parallel with the first and third portions, wherein the first alcove is defined in the first lavatory between the first wall and the third portion of the fifth wall and the second alcove is defined in the second lavatory between the second wall and the third portion of the fifth wall. Preferably, the first and second sink modules face in opposite directions and the assembly includes a first toilet module positioned adjacent the second wall and a second toilet module positioned adjacent the first wall.

In accordance with yet another aspect of the present invention there is provided a modular quad lavatory monument assembly that includes first, second, third and fourth walls that cooperate to form an outer shell that defines an interior, and fifth, sixth and seventh walls that cooperate to divide the interior into first, second, third and fourth lavatories. The outer shell includes first, second, third and fourth alcoves that extend between the first and second walls to form an alcove strip. The assembly also includes a first sink module positioned in the first alcove, a first mirror module positioned above the first sink module in the first alcove, a second sink module positioned in the second alcove, a second mirror module positioned above the second sink module in the second alcove, a third sink module positioned in the third alcove, a third mirror module positioned above the third sink module in the third alcove, a fourth sink module positioned in the fourth alcove, and a fourth mirror module positioned above the fourth sink module in the fourth alcove. In a preferred embodiment, the seventh wall extends between the third and fourth walls, and the fifth wall includes first, second and third portions. The first portion of the fifth wall is connected to the first wall, the third portion is connected to the seventh wall, and the second portion extends between and is not parallel with the first and third portions. The sixth wall includes first, second and third portions. The first portion of the sixth wall is connected to the second wall, the third portion is connected to the seventh wall, and the second portion extends between and is not parallel with the first and third portions. The first alcove is defined in the first lavatory between the first wall and the third portion of the fifth wall, the second alcove is defined in the second lavatory between the seventh wall and the third portion of the fifth wall, the third alcove is defined in the third lavatory between the second wall and the third portion of the sixth wall, and the fourth alcove is defined in the fourth lavatory between the seventh wall and the third portion of the sixth wall. Preferably, the first and third sink modules face in a first direction and the second and fourth sink modules face in a second direction that is opposite the first direction. In a preferred embodiment, the first portion of the fifth wall is co-planar and parallel to the first portion of the sixth wall, and the third portion of the fifth wall is co-planar and parallel to the third portion of the sixth wall.

In accordance with yet another aspect of the present invention there is provided a method of assembling a modular lavatory monument assembly. The method includes providing a first outer shell that includes first, second, third and fourth walls that cooperate to define a lavatory interior. The fourth wall includes an alcove extending outwardly therefrom, and a door is positioned on one of the second or third walls. The method further includes removably securing a first sink module in the alcove, and removably securing a first mirror module above the sink module in the alcove. In a preferred embodiment, the method includes the step of removably securing a first toilet module to one or more of the first, third or fourth walls. Preferably, the first toilet module does not contact the first sink module. In a preferred embodiment, the method includes the step of removing the first sink module from the alcove and lavatory interior, and removably securing a second sink module in the alcove. Preferably, the second sink module includes a sink cabinet, a faucet, a sink bowl, a counter, a waste compartment, a water supply system, a toilet paper dispensing unit and a set of mounting components on the sink cabinet that are removably mounted to associated mounting components in the alcove, just like the first sink module.

In a preferred embodiment, the method includes the steps of removing the first sink module, first mirror module and first toilet module from the lavatory interior, cleaning the outer shell, removably securing the first sink module in the alcove a second time, removably securing the first toilet within the lavatory interior a second time, and removably securing the first mirror module above the sink module in the alcove a second time. In a preferred embodiment, the method includes the steps of removing the first sink module, first mirror module and first toilet module from the lavatory interior, cleaning the outer shell, removably securing a second sink module in the alcove, removably securing a second toilet module to one or more of the first, third or fourth walls, and removably securing a second mirror module above the sink module in the alcove.

In a preferred embodiment, the method includes the step of removing the first toilet module from the lavatory interior, adding an extension to at least one of the first, second, third or fourth walls to provide an outer shell with a larger volume than the first outer shell, and removably securing either the original toilet module or a new toilet module in the lavatory.

In accordance with another aspect of the present invention there is provided a method that includes providing a first outer shell that includes first, second, third and fourth walls that cooperate to define a first lavatory interior. The fourth wall includes an alcove extending outwardly therefrom. A door is positioned on one of the second or third walls. The method also includes providing a second outer shell that includes first, second, third and fourth walls that cooperate to define a second lavatory interior. The fourth wall of the second outer shell includes an alcove extending outwardly therefrom and a door is positioned on one of the second or third walls. In the method, the second lavatory interior has a different volume than the first lavatory interior. In other words, the outer shells are made for two different types of lavatory monument assemblies. The method also includes removably securing a first sink module in the alcove of the first outer shell, removably securing a first mirror module above the first sink module in the alcove of the first outer shell to form a first lavatory monument assembly, removably securing a second sink module in the alcove of the second outer shell, and removably securing a second mirror module above the second sink module in the alcove of the second outer shell to form a second lavatory monument assembly. The first and second sink modules are identical, and the first and second mirror modules are identical. The method also includes installing the first lavatory monument assembly in a first location in an aircraft, and installing the second lavatory monument assembly in a second location in an aircraft.

In a preferred embodiment, the first lavatory monument assembly is positioned proximate an aircraft exit door that defines an aircraft exit path, and the alcove of the first lavatory monument assembly extends into the aircraft exit path. Preferably, the method also includes the steps of removing the first sink module and first mirror module from the first lavatory interior, removing the second sink module and second mirror module from the second lavatory interior, removably securing a third sink module and a third mirror module in the alcove of the first outer shell, and removably securing a fourth sink module and a fourth mirror module in the alcove of the second outer shell. The third and fourth sink modules are identical, and the third and fourth mirror modules are identical. Preferably, the steps of removing the first and second mirror and sink modules and removably securing the third and fourth mirror and sink modules are performed without removing the first or second outer shells from the aircraft.

In accordance with an aspect of the present invention there is provided a lavatory monument assembly configured to be positioned in the interior of an aircraft that includes a first wall and a second wall that are generally parallel to one another, and the second wall is longer than the first wall. The lavatory monument assembly further includes a third wall and a fourth wall, and the third wall and the fourth wall generally are perpendicular to the first wall and the second wall, and the third wall and the fourth wall connect to the first wall and the second wall to form a lavatory interior. The first portion of the fourth wall generally is parallel to the third wall, and a second portion of the fourth wall angles inwardly along generally straight lines into the lavatory interior, such that the area in the lavatory interior proximate the first wall is less than the area proximate the second wall. The lavatory monument assembly further includes a toilet in the lavatory interior proximate the first wall, and it further includes a door positioned on one of the first, second, third, or fourth walls. In a preferred embodiment, the lavatory monument assembly further includes a sink, and preferably, the first wall is generally parallel and adjacent to an interior aircraft wall when the lavatory monument assembly is placed proximate an aircraft exit door. Preferably, the lavatory monument is placed proximate a row of at least two aircraft seats. Preferably, the second portion of the fourth wall angles inwardly at about 90 degrees with respect to the first portion of the fourth wall to form an alcove proximate the second wall, and the second portion of the fourth wall further connects to a third portion of the fourth wall that is generally parallel to the third wall and that connects to the first wall. The sink is positioned in the alcove. In a preferred embodiment, the second portion of the fourth wall curves inwardly along a generally curved line instead of angling inwardly along generally straight lines, and preferably, the lavatory monument assembly further comprises at least one recessed seat on the fourth wall, proximate the second wall. Preferably, the toilet defines a vertical plane that bifurcates the toilet, and the toilet is positioned such that the vertical plane is not parallel to the third wall.

In accordance with another aspect of the present invention there is provided an aircraft with a cabin having a side wall that includes at least one exit door, wherein the exit door includes an exit corridor adjacent thereto. The aircraft also includes a lavatory monument assembly positioned within the cabin, wherein the lavatory monument assembly includes a first wall and a second wall, and the first wall generally is parallel to the second wall, and the second wall is longer than the first wall. The lavatory monument assembly also includes a third wall and a fourth wall, and the third wall and the fourth wall generally are perpendicular to the first wall and the second wall. The third wall and the fourth wall connect to the first wall and the second wall to form a lavatory interior, and a first portion of the fourth wall generally is parallel to the third wall, and a second portion of the fourth wall angles inwardly along generally straight lines into the lavatory interior, such that the area in the lavatory interior proximate the first wall is less than the area proximate the second wall. The lavatory monument assembly also includes a toilet in the lavatory interior proximate the first wall, and it includes a door positioned on one of the first, second, third, or fourth walls. In a preferred embodiment, the lavatory monument assembly further includes a sink. Preferably, the second portion of the fourth wall angles inwardly at about 90 degrees with respect to the first portion of the fourth wall to form an alcove proximate the second wall, and the second portion of the fourth wall further connects to a third portion of the fourth wall that generally is parallel to the third wall and that connects to the first wall. The sink is positioned in the alcove. Preferably, the lavatory monument assembly is positioned proximate the exit door, and the third portion of the fourth wall defines a portion of the exit corridor. Preferably, the lavatory monument assembly is placed proximate a row of at least two aircraft seats. In a preferred embodiment, the second portion of the fourth wall curves inwardly along a generally curved line instead of angling inwardly along generally straight lines, and preferably, the lavatory monument assembly further includes at least one recessed seat on the fourth wall, proximate the second wall. Preferably, the toilet defines a vertical plane that bifurcates the toilet, and the toilet is positioned such that the vertical plane is not parallel to the third wall. Preferably, the lavatory monument assembly is positioned proximate the exit door, and the third portion of the fourth wall defines a portion of the exit corridor.

BRIEF DESCRIPTION OF THE DRAWINGS

FIG. 10 is an exploded perspective view of a modular lavatory monument assembly in accordance with a preferred embodiment of the present invention;

FIG. 12A is a perspective view of the modular lavatory monument assembly of FIG. 10 with the modules outside of the outer shell prior to assembly and showing the mounting components on the modules;

FIG. 12B is an exploded perspective view of the modules ready to be mounted on the outer shell;

FIG. 14 is a top plan view of a modular lavatory monument assembly with a storage compartment in accordance with another preferred embodiment of the present invention;

FIG. 15 is a perspective view of the modular lavatory monument assembly of FIG. 13;

Like numerals refer to like parts throughout the several views of the drawings.

DETAILED DESCRIPTION OF THE PREFERRED EMBODIMENTS

Figure 1:
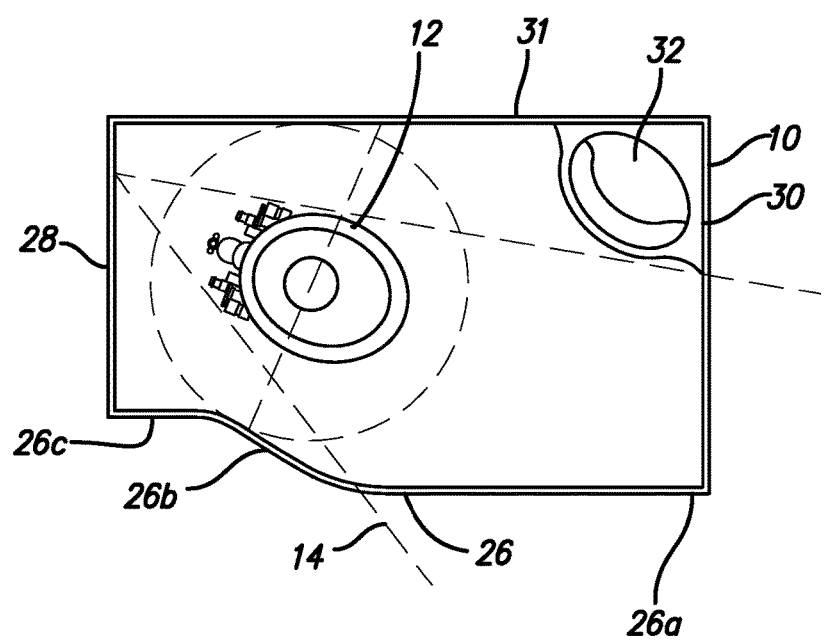
FIG. 1 is a top plan view of a lavatory monument assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but are not necessarily, references to the same embodiment; and, such references are intended to refer to at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to one of skill in the art regarding the description of the disclosure. For convenience, certain terms may be highlighted, for example using italics and/or quotation marks. The use of any such highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
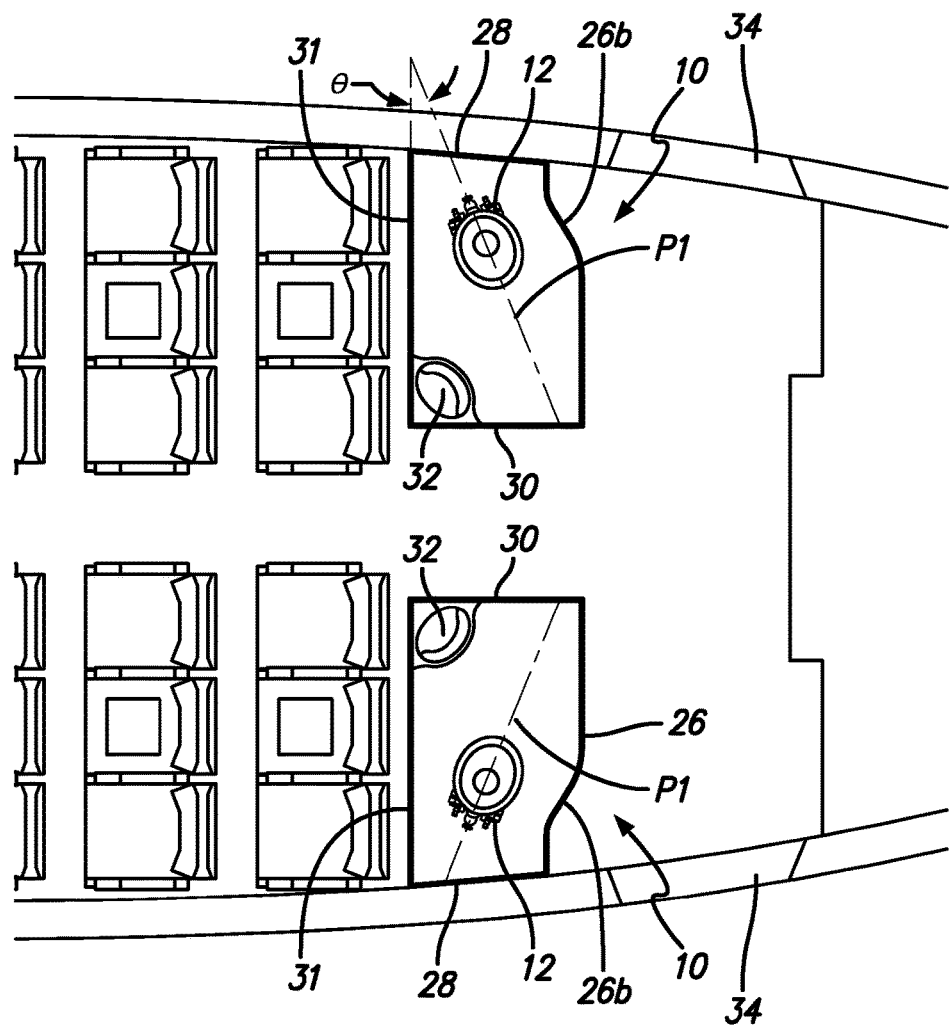
FIG. 2 is a top plan view of a potential layout within an aircraft of the lavatory monument assembly shown in FIG. 1, including the lavatory monument assembly position with respect to aircraft exits.
Figure 3:
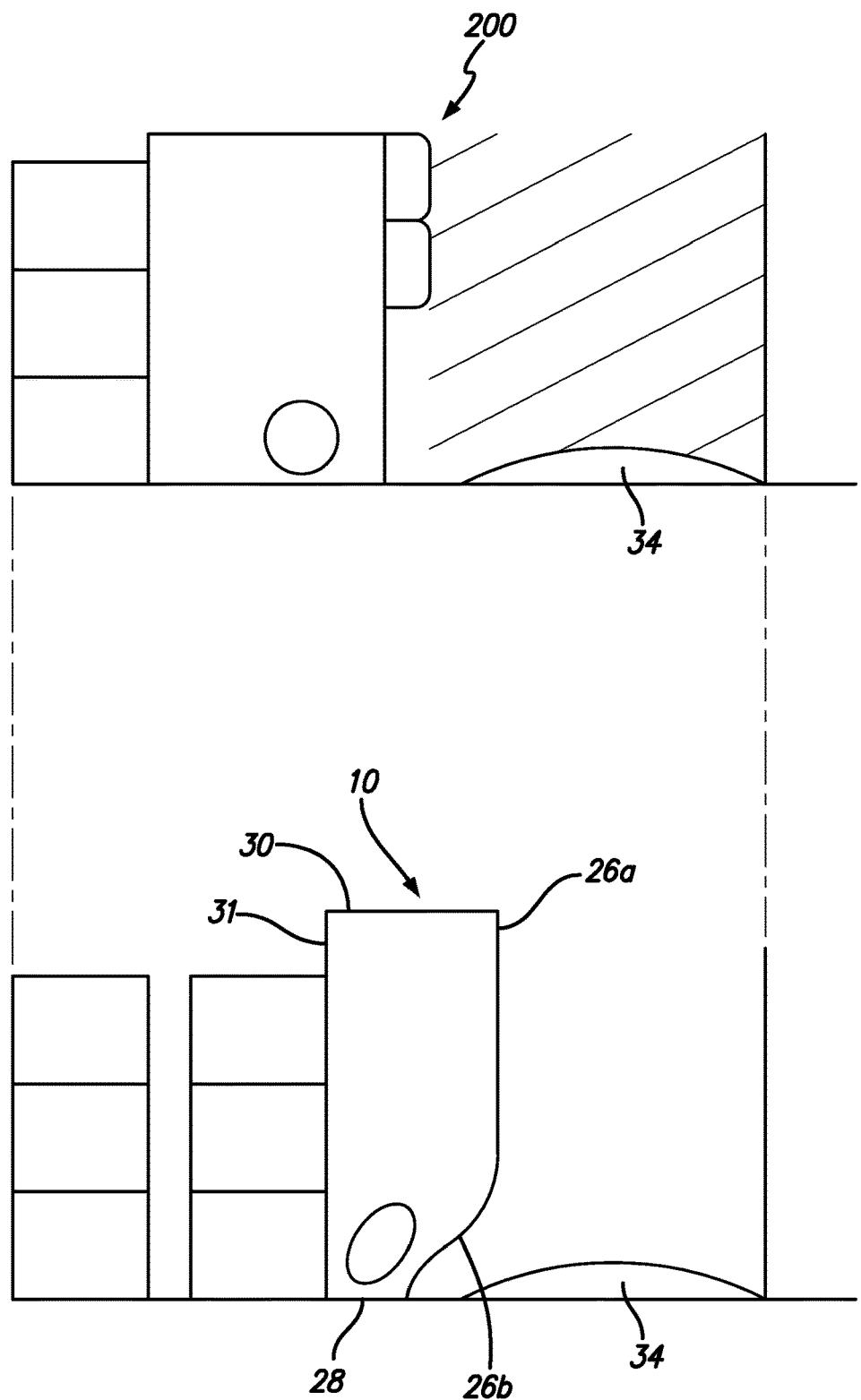
FIG. 3 is a top plan view of the lavatory monument assembly of FIG. 1 positioned in an aircraft and showing a comparison with a conventional lavatory monument.

Referring now to the drawings, wherein the showings are for purposes of illustrating the present invention and not for purposes of limiting the same, FIGS. 1-3 show an aircraft lavatory monument assembly 10 that provides an angled toilet 12 orientation, a generally V-shaped passenger footprint 14 and a door 40. In a preferred embodiment, the lavatory monument assembly includes first wall 28, second wall 30, third wall 31 and fourth wall 26 (as well as ceiling 33, which can be omitted).

As shown in FIGS. 1-3, in a preferred embodiment, fourth wall 26 includes a first portion 26a and a second portion 26b that is curved. In other words, in this embodiment, the lavatory monument assembly 10 does not have a rectangular footprint. As can be seen in FIG. 2, the toilet defines a vertical plane P1 that bifurcates the toilet, and the toilet is positioned such that the vertical plane P1 is not parallel to at least the third wall 31 (see FIG. 2 and angle θ). The angled toilet 12 orientation and generally V-shaped passenger footprint allow for increased comfort in a smaller footprint lavatory when compared to the prior art. This is achieved by having the minimum lavatory width in the rear of the toilet (see first wall 28), and having broader dimensions in front of the toilet (see second wall 30), as shown in FIG. 2 and in another preferred embodiment depicted in FIG. 4. Conventional lavatory monuments generally have a rectangular footprint. The increased passenger footprint can also be achieved by providing a toilet 12 that is positioned such that it is angled, as is best shown in FIG. 2. In other words, the toilet 12 is angled such that a vertical plane that bifurcates the toilet 12 is non-parallel to and forms an angle with the forward wall of the lavatory monument assembly (when positioned as shown in FIG. 1). This allows a passenger seated on the toilet 12 to use the extra space created by the curved fourth wall 26. However, this is not a limitation on the present invention, and the toilet can be positioned such that it faces straight inboard. FIG. 2 shows a potential layout plan of the lavatory monument assembly 10, as described above, within an aircraft.

FIG. 3 shows a comparison of a conventional lavatory monument 200 to the lavatory monument assembly 10 of the present invention and shows the possible space savings and ability for an airline to add a row or more of seats, while providing sufficient space in front of exit door 34 for ingress and egress in compliance with applicable FAA regulations.

As shown in FIG. 3, with the arrangement of the present invention lavatory monument assembly 10, a suitable amount of exit space is provided between the aft wall of the lavatory monument assembly 10 and the wall (or row of seats or other object) aft thereof. With the footprint of the lavatory monument assembly 10, the entire lavatory monument assembly 10 can be positioned aft of where the conventional lavatory monument was positioned. As is shown in FIG. 3, the second portion 26b allows fourth wall 26 to curve around the exit door. By positioning the lavatory monument assembly 10 aft of where the prior art monument is positioned and reducing the exit space (but still allowing enough under regulations), an extra row of seats can be added.

FIG. 2 illustrates a possible layout of the lavatory monument assembly in an aircraft, including the lavatory monument assembly with respect to aircraft exits 34, showing the intended space saving results that can be achieved in accordance with the present invention. As a result of the space savings, aircraft may be able to fit additional seats, thereby gaining revenue, increased seat pitches, or additional monuments forward of the lavatory.

Figure 4:
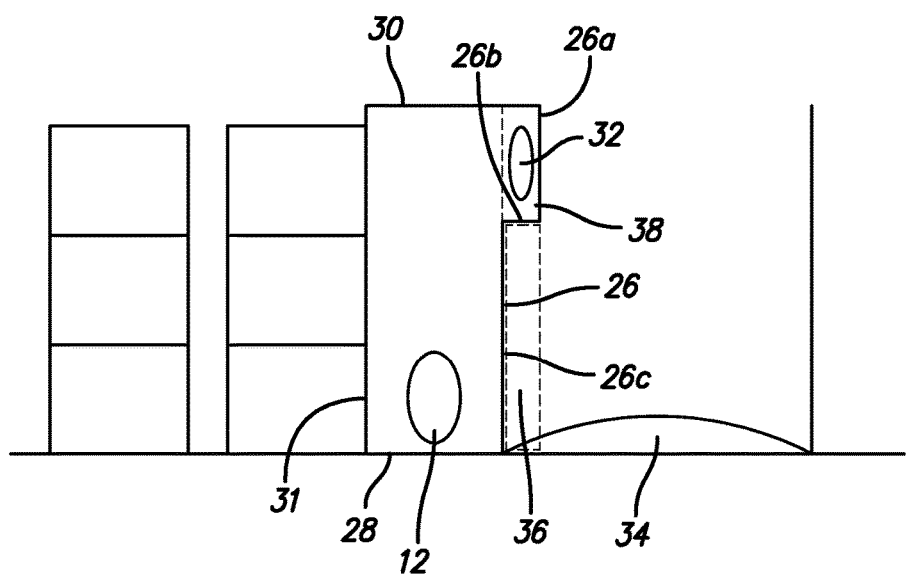
FIG. 4 is a top plan view of a lavatory monument assembly in accordance with another preferred embodiment of the present invention.
Figure 5:
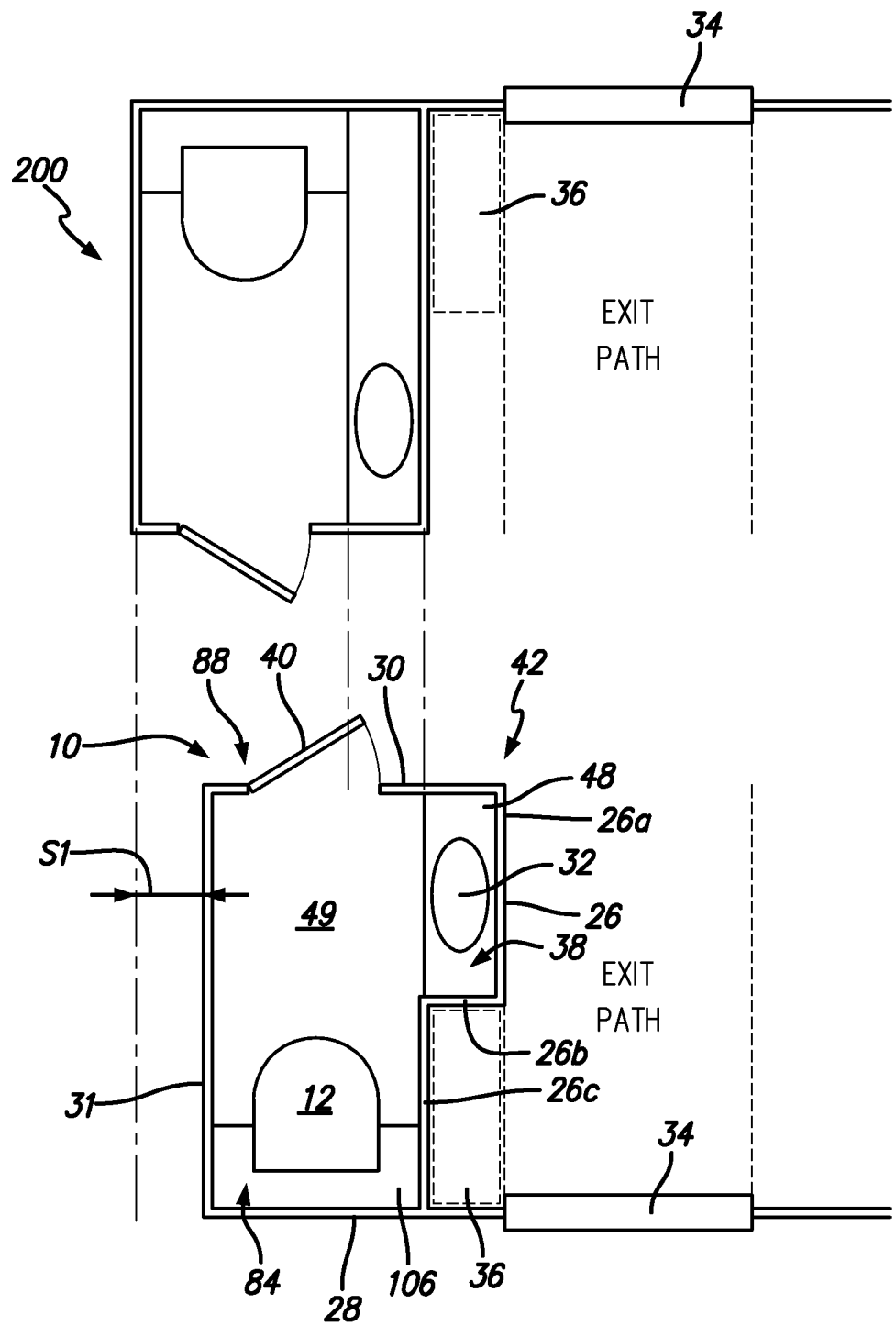
FIG. 5 a top plan view of a lavatory monument assembly in accordance with another preferred embodiment of the present invention positioned in an aircraft and showing a comparison with a conventional lavatory monument.

FIGS. 4-5 show another preferred embodiment for achieving the additional space by having a smaller lavatory width in the rear of the toilet (see first wall 28), than the broader dimensions in front of the toilet (see second wall 30) (as shown in FIG. 3, and as can also be seen in FIG. 4). As shown in FIG. 4, the additional space that is achieved can be used for creating a compartment or alcove 38 that can include a fixture or component therein. In a preferred embodiment, a sink 32 is positioned in alcove 38. However, this is not a limitation on the present invention. Placement of the sink 32 in this position may be desirable in some embodiments of the present invention because it allows additional passenger room in the lavatory in the area immediately in front of the toilet 12. And, as described above, placement of sink 32 in this position is possible due to the overall broader dimensions of second wall 30 as compared to first wall 28. It will be appreciated that in another embodiment, the first wall 28 may have broader/longer dimensions than the second wall 30 or they may be of equal length. Furthermore, by positioning the sink 32 in alcove 38, shoulder room is preserved in the area immediately around the toilet 12.

It is contemplated and intended that the preferred embodiment depicted in FIG. 4 include a door positioned on one of the walls of the lavatory monument assembly, similar or identical to the door 40 depicted in FIGS. 1 and 2. As shown in FIG. 4, in a preferred embodiment, fourth wall 26 includes first portion 26a, second portion 26b and third portion 26c. First portion 26a, second portion 26b and a portion of second wall 30 cooperate to define alcove 38. In a preferred embodiment, sink 32 is positioned within alcove 38 such that the sink and any related components (e.g., drain, cabinet, mirror, etc.) are all positioned within the alcove 38.

FIGS. 4-5 also shows the flight attendant assist space 36 that is required on most aircraft. FIG. 4 shows that the assist space 36 is preserved by positioning the alcove 38 inboard of first wall 28 and the exit 34. This allows the lavatory monument assembly 10 to be positioned as aft as possible (when in the back of an aircraft) to maximize seating. The curved wall discussed above provides the same advantage.

In the preferred embodiment shown in FIGS. 4-5, the space immediately in front of/adjacent to the exit of the aircraft is sufficient under FAA regulations. Where the walls comprising alcove 38 are depicted in FIG. 4 as being generally at right angles, it is contemplated and intended that the angles of the walls used to form alcove 38 could range anywhere from 0 to 90 degrees. Moreover, while FIG. 4 is a plan view depicting generally straight lines for the walls of the lavatory monument assembly, it is contemplated and intended that the walls, when depicted in a perspective view, need not necessarily be along straight lines in the vertical, but alternatively can be shaped according to the interior of the aircraft or other factors and considerations commonly known to those of skill in the art (as can be seen, for example, and not by way of limitation), in the perspective views of the lavatory monument assembly shown in FIGS. 1 and 2). Those of ordinary skill in the art should understand that the claim language referring to parallel and perpendicular and the like refers to the plan view of the lavatory monument assembly and any aircraft LOPA in which it is positioned.

FIGS. 4-27 generally show embodiments of lavatory monument assemblies that include a compartment or alcove 38, as discussed above with respect to FIGS. 4-5. FIGS. 4-13 show an L-shaped lavatory monument assembly 10 with a single lavatory space therein that includes space outside thereof for flight attendant assist or for other use (e.g., a compartment). In a preferred embodiment, the alcove 38 extends from the floor to the ceiling.

FIG. 5 shows a comparison between a conventional lavatory 200 and a lavatory monument assembly 10 in accordance with a preferred embodiment of the present invention. In a preferred embodiment, some to all of the systems components are positioned in the alcove 38 (e.g., within the sink and mirror modules). As shown in FIG. 5, compared to the conventional lavatory 200, the lavatory monument assembly 10 provides saved space (see S1 in FIG. 5), which can lead to the inclusion of an extra row. In an exemplary embodiment, this can be as much as twelve inches or more. In this configuration, with the inclusion of the alcove 38, the flight attendant assist space 36 adjacent the exit door 34 is maintained. In the conventional lavatory 200, the sink and counter extend the entire width of the lavatory. In lavatory monument assembly 10, the sink module 42 is positioned in alcove 38, thereby taking advantage of the space occupied by the extended counter in the conventional lavatory 200. In other words, by shrinking the extended counter and cabinet in the conventional lavatory 200, space can be provided for assist space or for storage space. Furthermore, as will be appreciated by those of ordinary skill in the art, when positioned next to the exit door 34, the alcove 38 extends into an area of space that is typically not used in most aircraft. Placing the sink module 42 and mirror module 46 in the alcove 38 allows the manufacturer to be able to control size (by being to change all walls outside of the alcove as desired), provides separate personal space and toilet space, separates the toilet and the sink/counter so that they are not in contact with one another and provides more usable storage (see FIG. 14 below).

Figure 6:
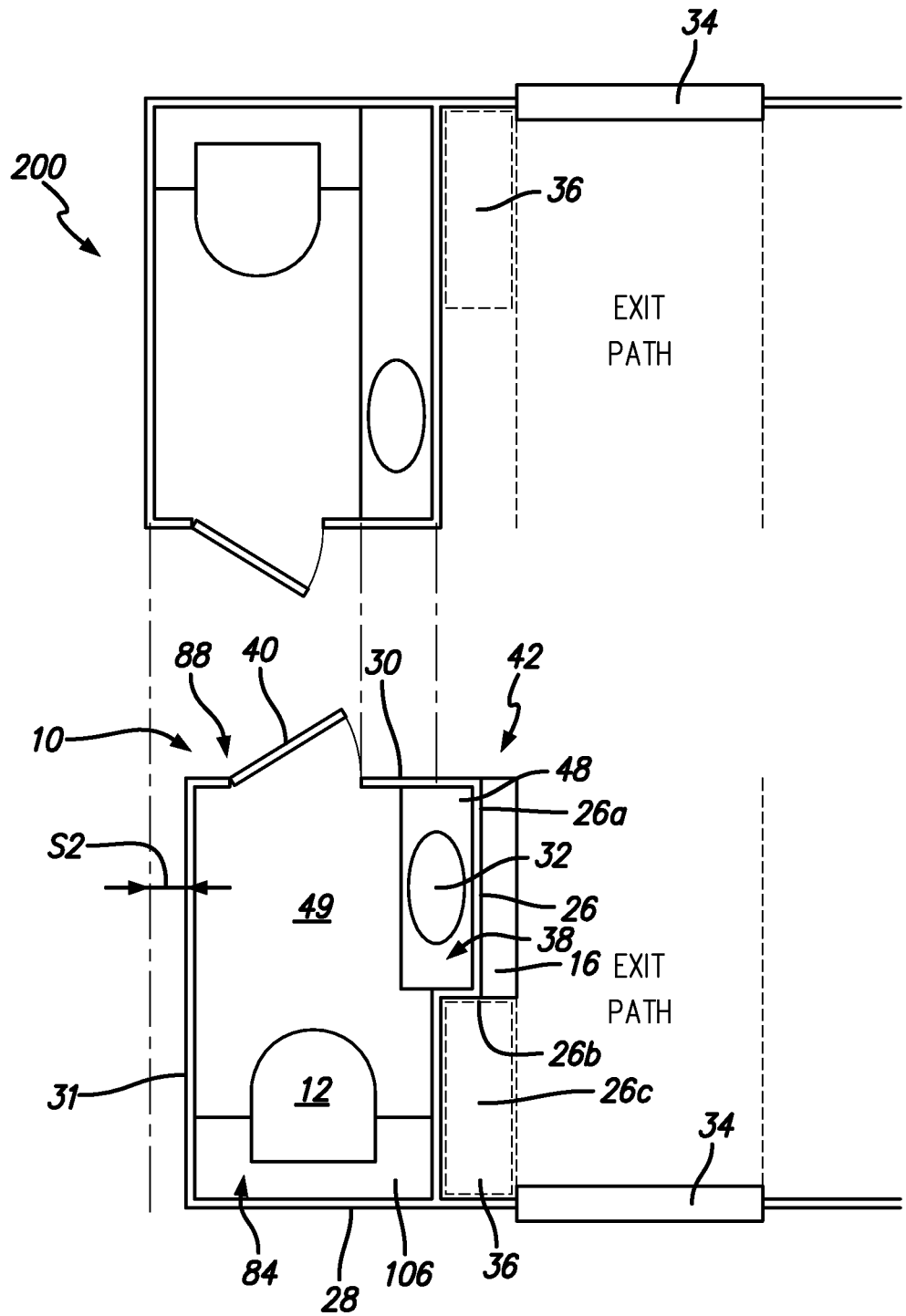
FIG. 6 is a top plan view of the lavatory monument assembly of FIG. 5 positioned in an aircraft with a flight attendant seat thereon and showing a comparison with a conventional lavatory monument.

FIG. 6 shows another embodiment of a lavatory monument assembly 10 that is similar to the embodiment shown in FIG. 5, but that includes a flight attendant seat 16 on the fourth wall 26, and particularly on the first portion 26a of the fourth wall (i.e., on the outside of the alcove 38). In this embodiment, the lavatory monument assembly 10 is moved aft compared to the conventional lavatory 200. As shown in FIG. 6, compared to the conventional lavatory 200, the lavatory monument assembly 10 provides saved space (see S2 in FIG. 6), which can lead to the inclusion of an extra row. In an exemplary embodiment, this can be as much as six inches or more.

Figure 7:
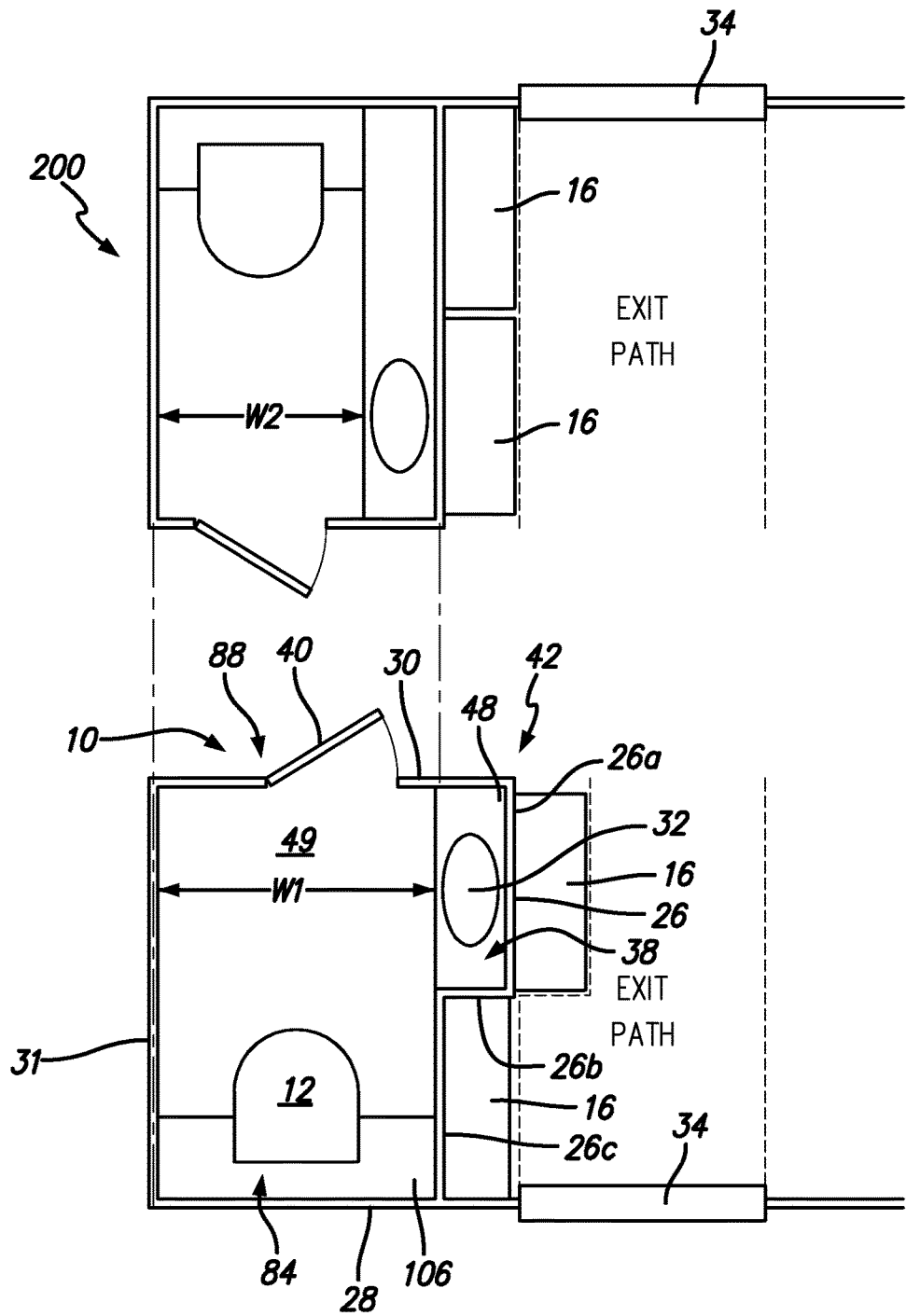
FIG. 7 is a top plan view of a lavatory monument in accordance with another preferred embodiment of the present invention positioned in an aircraft with two flight attendant seats thereon and showing a comparison with a conventional lavatory monument.

FIG. 7 shows another embodiment of a lavatory monument assembly 10 that is similar to the embodiments shown in FIGS. 5 and 6, but that includes two flight attendant seats 16 on the fourth wall 26, and particularly on the first and third portions 26a and 26c of the fourth wall 26. In this embodiment, the lavatory monument assembly 10 is more spacious (e.g., wider forward to aft) compared to the conventional lavatory 10 (see arrows W1 and W2 in FIG. 7, where W1 is longer than W2). It will be appreciated by those of skill in the art that the conventional lavatory 200 footprint is rectangular and includes a double flight attendant seat 16 as shown in FIG. 7. However, by breaking this traditional footprint and providing the L-shaped lavatory with an alcove 38, as shown in FIG. 7, the flight attendant seats can be separate units and volume can be gained in the lavatory, as compared to the conventional lavatory. In another embodiment, the lavatory shown in FIG. 7 can omit the flight attendant seats.

Figure 8A:
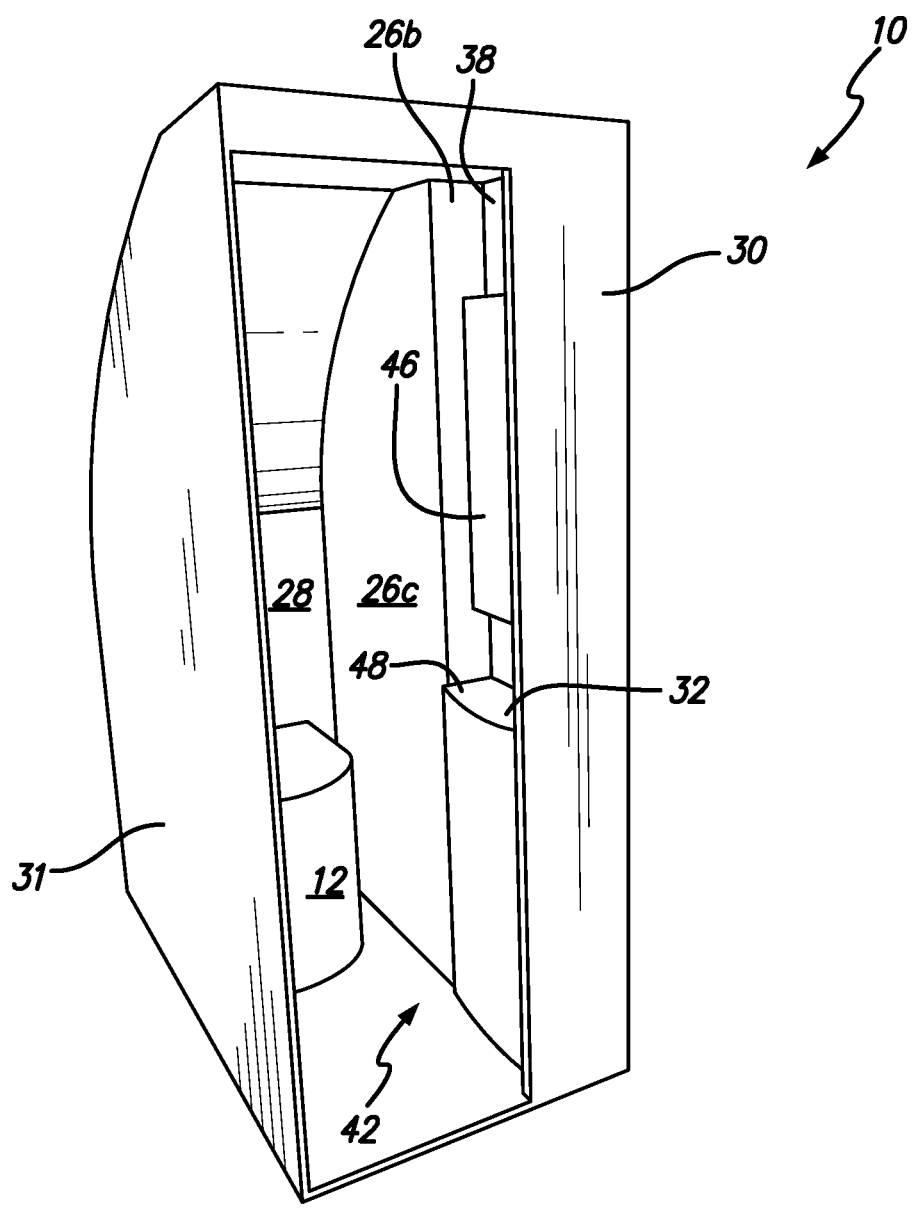
FIG. 8A is a perspective view of the lavatory monument assembly of FIG. 5.
Figure 8B:
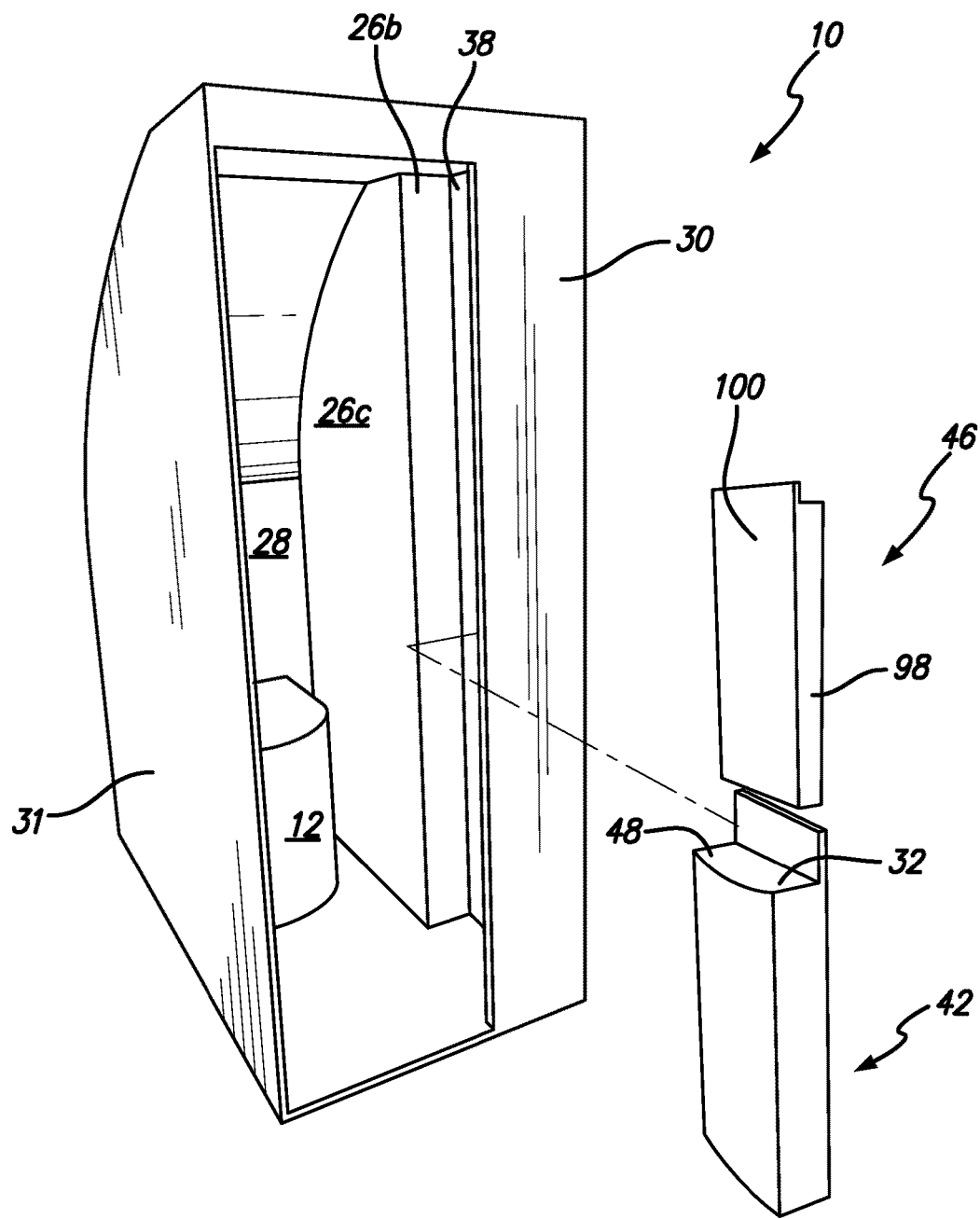
FIG. 8B is a perspective view of the lavatory monument assembly of FIG. 5 with the sink and mirror modules removed.

In a preferred embodiment, many of the lavatory systems components (plumbing, controls for water, etc.) are positioned within the sink unit or module 42. The sink module 42 can include (but is not limited to) the sink 32, counter 48, back splash, faucet 92, water heater, water filter, plumbing, pipes, sink cabinet or enclosure 41, thermostat unit, controllers, electrical harnesses, valves, space for waste, etc. As is shown in FIGS. 8A-8B, in a preferred embodiment, the sink module 42 can be fitted within alcove 38 as a unit. In a preferred embodiment, the lavatory monument assembly 10 also includes a mirror module 46. The mirror module 46 can include (but is not limited to) a mirror 100 and a mirror cabinet 98. In another embodiment, the sink module and mirror module can be a single module or can be further divided into more modules.

In a preferred embodiment, a modular lavatory system is provided where the same size sink module 42 and/or mirror module 46 can be used in different lavatory monument assemblies. This improves part commonality, thereby making it easier to manufacture lavatory monuments for different aircraft or several lavatory monuments within the same aircraft (see, e.g., FIGS. 26-27). For example, the same sink module 42 and/or mirror module 46 can be used with the lavatory monument assemblies 10 shown in FIGS. 1-13, and can also be used in the lavatory monument assemblies 50, 70, 112 or 120 as described below.

Figure 9:
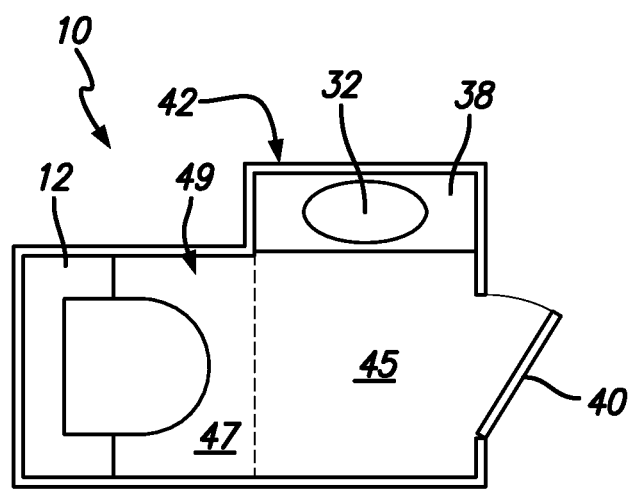
FIG. 9 is a top plan view of the lavatory monument assembly of FIG. 7 showing the toilet space and personal space created by the present invention.

FIG. 9 shows the separate personal space 45 and toilet space 47 that is created within the lavatory interior 49. The personal space 45 and toilet space 47 are defined and divided by the second portion 26b of wall 26 extended, as is best shown in FIG. 9. As is shown in the drawings, in preferred embodiment, the toilet does not touch the sink module 42 or the alcove 38.

FIG. 10 shows an inside view of an exemplary embodiment of the lavatory monument assembly 10 with the second and third walls 30 and 31 removed. It will be appreciated that a lavatory with this layout may not to be modular. However, in a preferred embodiment, the lavatory monument assembly 10 includes generally an outer shell 80 (that includes first 28, second 30, third 31 and fourth 26 walls, a floor 81 and ceiling 33), a sink module 42, mirror module 46, toilet module 84, ceiling module 86 and door module 88. In embodiments of the invention, the outer shell can omit the floor, the ceiling or any one or more of the walls. As shown in FIG. 10, the lavatory monument assembly 10 also includes a floor pan 90.

The modularity discussed herein provides for efficient manufacturing, the ability to change modules according to airline needs, and the ability to use and mount common modules in different sized or shaped outer shells, among other advantages that may or may not be described herein. Generally, the present invention provides common modules between different lavatories with an adjustably sized outer shell (described below), but with common mount points or commonly spaced mount points, thus allowing for multiple lavatory configurations with minimal changes. In another embodiment, other modules other than those listed above can be provided. In yet another embodiment, one or more of the modules listed above can be omitted. In a preferred embodiment, the modules can be installed or removed quickly and easily, which provides for interchangeability, easy maintenance, etc.

In a preferred embodiment, the modular lavatory system includes a mounting system that is common for different modules and different outer shells. Preferably, each sink module 42 includes mounting components that mate with common mounting components on different outer shells. This allows the modules to be interchangeable between identically sized and different sized outer shells. For simplicities sake, the set of mounting components on the outer shell are labeled 97a and the set of mounting components on the modules are labeled 97b.

In a preferred embodiment, the sink module 42 includes at least one or more of a sink, 32, sink cabinet 41, faucet 92, mounting components 97b, water heater, drain, trash, water filter, controller, necessary electronics, toilet paper dispenser 94, counter 48, soap and other components commonly found within the sink cabinet. For example, the sink module 42 can also include a paper towel dispenser, lighting, storage, etc. In an exemplary embodiment, the sink module 42 includes a sink cabinet 41, a counter 48, sink bowl 32, drain, waste compartment 114, toilet paper dispenser 94, a water heater, faucet 92, drain (and appropriate plumbing), and mounting components 97b on the back of the sink cabinet 41.

In a preferred embodiment, the mirror module 46 includes at least one or more of a mirror cabinet 98, mounting components 97b on the back of the cabinet 98, a mirror 100, an amenities dispenser, paper towel dispenser 102, integrated LED lighting and associated electronics, call attendant button, gasper/air, sink lighting and other components commonly found within the mirror cabinet.

In a preferred embodiment, the ceiling module 86 includes at least one or more of a dome light or other lighting, oxygen masks/generator, speakers and a smoke detector, which are all housed in a housing that includes mounting components 97b thereon.

In a preferred embodiment, the toilet module 84 includes at least one or more of a toilet 12 (bowl, seat and lid, etc.), mounting components 97b and associated plumbing connections and a shroud 106. Preferably, each shroud 106 in the modular lavatory system has a common curvature that it can fit on the wall and cover opening 110. In a preferred embodiment, the shroud 106 extends between the third wall 31 and the third portion 26c of the fourth wall 26.

In a preferred embodiment, the door module 88 includes at least one or more of a door 40, door frame 108, handle, hinge, dead bolt, vent and associated components therefor. The door 40 can be a blade door, a bi-fold door or any other type of known door. It will be appreciated that each of the modules is comprised of one or more components. The listing of components herein is not intended to be limiting, but only exemplary.

In a preferred embodiment, common mounting components can be included within a module. For example, the sink module can include a mounting system that provides different counters and/or bowls that can be mounted on a common sized cabinet.

Figure 11A:
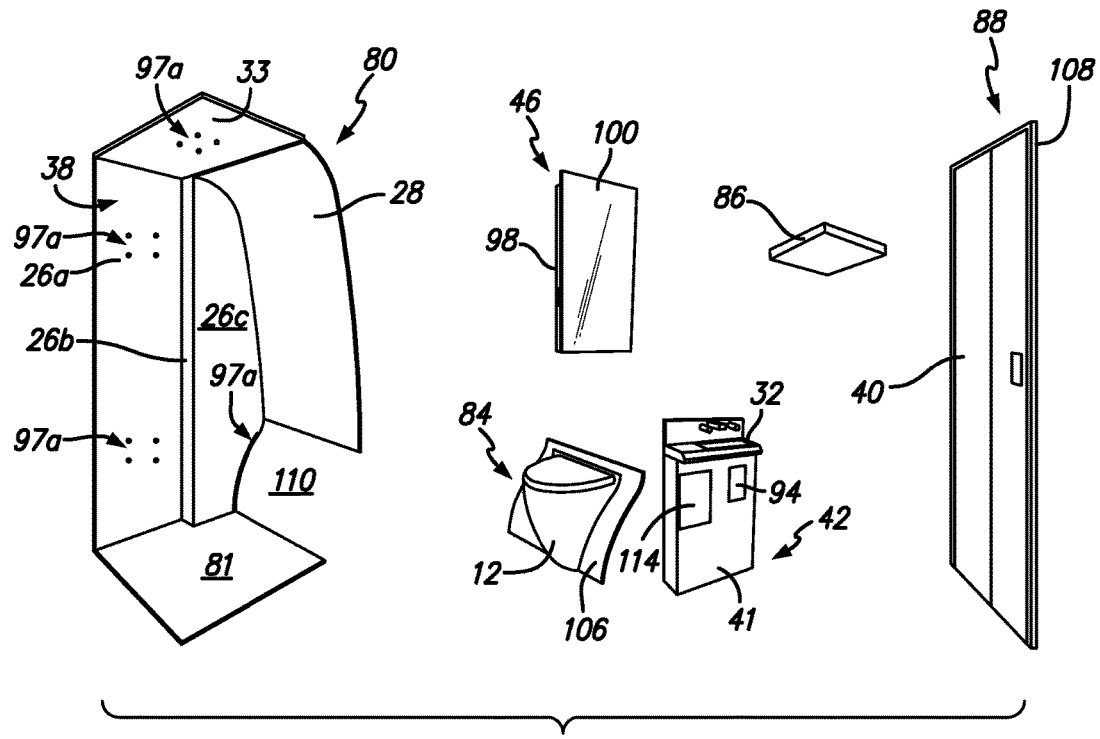
FIG. 11A is a perspective view of the modular lavatory monument assembly of FIG. 10 with the modules outside of the outer shell prior to assembly.
Figure 11B:
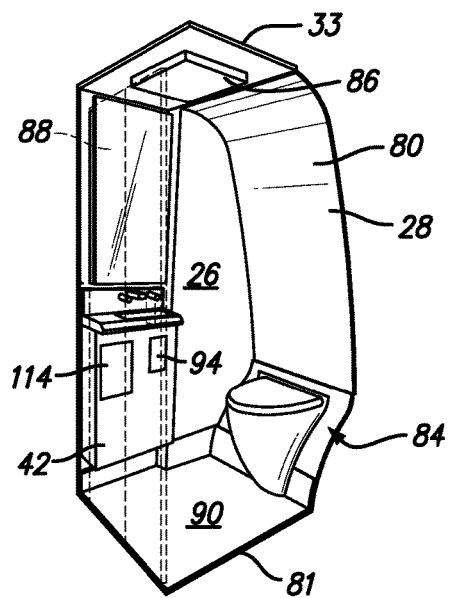
FIG. 11B is a perspective view of the modular lavatory monument assembly of FIG. 11A after assembly.

FIGS. 11A-11B show an exemplary modular lavatory system and the original construction of a lavatory monument assembly 10 of the present invention. As shown in FIG. 11A, in use, the outer shell 80, which includes first wall 28, second wall 30 (not shown in FIG. 11A), third wall 31 (not shown in FIG. 11A), fourth wall 26, floor 81 and ceiling 33, is constructed or provided and the sink module 42, mirror module 46, toilet module 84, ceiling module 86 and door module 88 are all positioned and secured within the outer shell 80 to form the lavatory monument assembly 10, as shown in FIG. 11B. The outer shell 80 is a bonded structure that forms a "box" into which the modules can be positioned and secured. The sink module 42 and mirror module 46 are positioned and secured within alcove 38. The ceiling module 86 is positioned under and secured to ceiling 33. In an embodiment without a ceiling, the ceiling module 86 can be secured within the opening at the top of the monument. The toilet module 84 is positioned on and secured to the first wall 28 (which preferably includes a plumbing opening 110 therein for making plumbing connections). In a preferred embodiment, the first wall 28 and/or side walls 26 and 31 include mounting components 97b (e.g., brackets) thereon that allows different sized toilet modules 84 (i.e., different width shrouds 106) to fit universally thereon. The door module 88 is positioned and secured within an opening in the third wall 31. During construction, wall treatments and other decorations can be added as necessary. As will be appreciated, and as described below, the modules can be included in many different types of lavatories.

FIGS. 12A-12B show the sets of mounting components 97a and 97b on the outer shell 80 and the modules. As discussed herein, the universal, repeatable mounting system provides for the interchangeability of modules between different outer shells (whether the same size or not.

Figure 13:
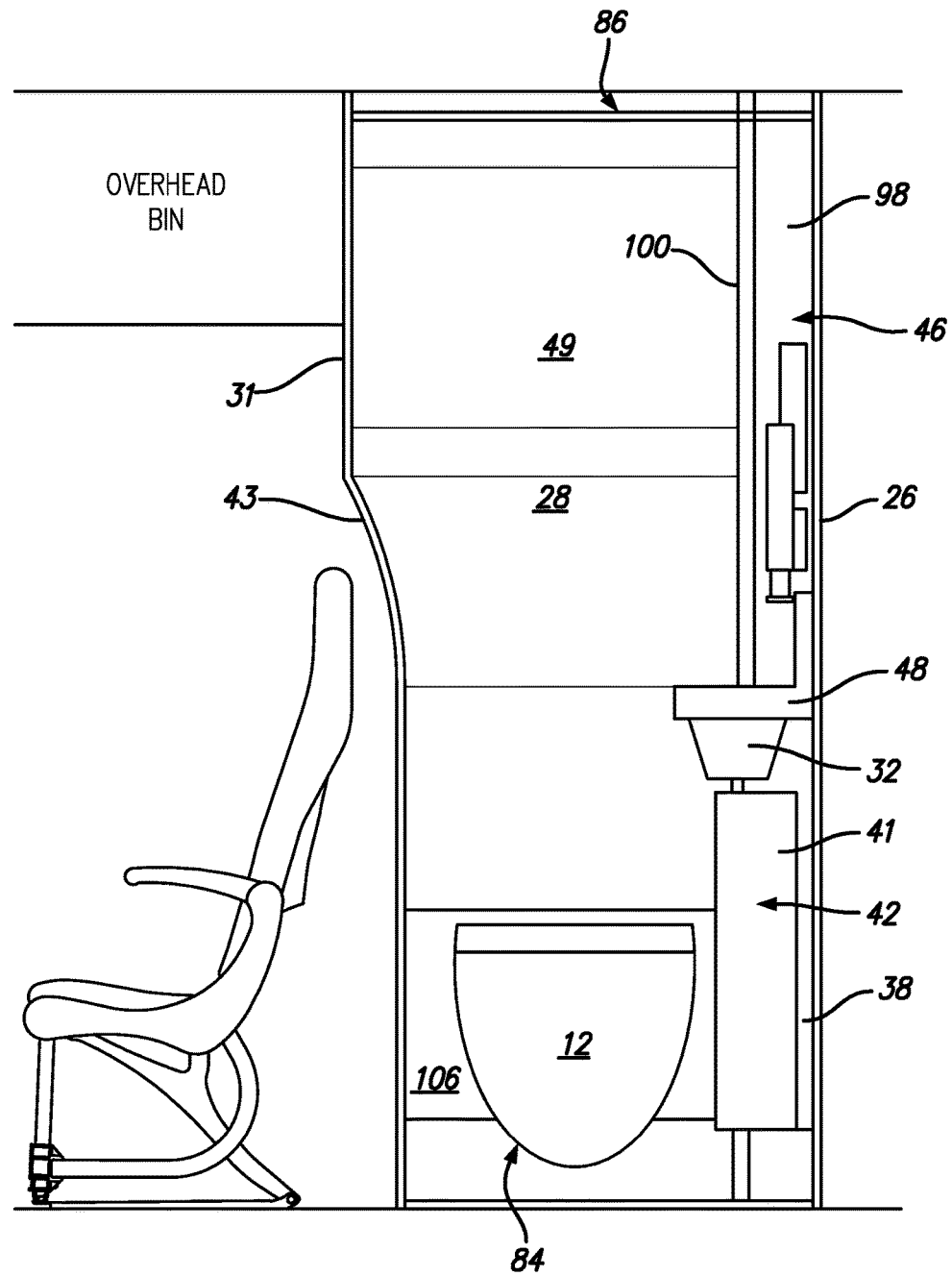
FIG. 13 is an elevational view of the a lavatory monument assembly with the second wall removed in accordance with another preferred embodiment of the present invention.

FIG. 13 shows an elevational view of the lavatory monument assembly 10 with the second wall 30 removed and showing third wall 31 with a curved portion 43 therein. The curved portion 43 provides for extra space for seats forward of the lavatory and extra shoulder space for users standing in the lavatory. The curved portion 43 also provides for the upper portion of the lavatory to extend further forward, thereby allowing it to meet up with the overhead bins.

Other embodiments of lavatory monument assemblies will now be described. It should be understood that the lavatory monument assemblies and the configurations thereof may nor may not be modular. Accordingly, the description herein regarding the lavatory monument assemblies being modular is not a limitation on the present invention.

Figure 16:
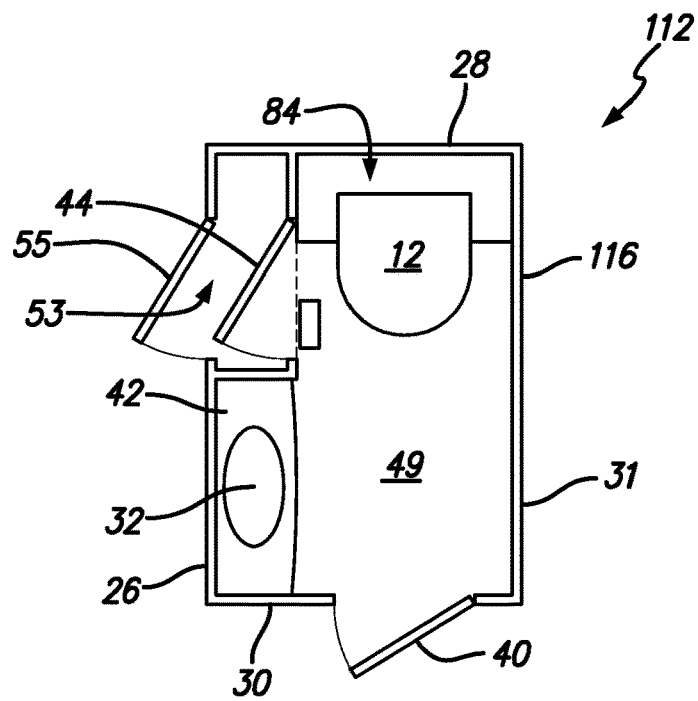
FIG. 16 is a top plan view of the modular lavatory monument assembly of FIG. 13 with a door on both the inside and the outside of the storage compartment.

FIGS. 14-16 show a lavatory monument assembly 112 that includes a storage unit or compartment 53. In a preferred embodiment, the storage compartment 53 extends from the floor 81 to above the counter 48 and preferably all the way to ceiling 33, and is part of the outer shell bonded structure 116. As shown in FIG. 14, the storage compartment 53 is defined by adding first and second exterior walls 117 and 118 to the outer shell shown in FIGS. 4-5. Therefore, the storage compartment 53 is defined by exterior walls 117 and 118 and the second and third portions 26b and 26c of fourth wall 26. Describing it another way, the storage compartment 53 is defined by extending the first and fourth walls 28 and 26 and adding the interior wall portions 26b and 26c. In this embodiment, the second wall portion 26b is also referred to as the first storage compartment wall and the third wall portion 26c is also referred to as the second storage compartment wall. In constructing the outer shell 116, each of the walls 26, 28, 117, 118 or portions thereof can be unitary or separate pieces that are bonded together. It will be appreciated that the first exterior wall 117 is connected to the first wall 28 and the second exterior wall is connected to the first portion 26a of the fourth wall 26. In a preferred embodiment, the first exterior wall 117 is co-planar with the first wall 28 and the second exterior wall 118 is co-planar with the first portion 26a of the fourth wall 26. However, this is not a limitation and the first exterior wall 117 can connect to the first wall 28 at an angle and the second exterior wall 118 can connect to the first portion 26a of the fourth wall 26 at an angle.

The storage compartment 53 can be used in a number of different ways. In an embodiment, the storage compartment 53 can be accessible from inside the lavatory. For example, as shown in FIG. 15, the storage compartment 53 can be used for housing a paper towel dispenser 102 and/or a trash receptacle 114. In another embodiment, as shown in FIG. 16, the storage compartment 53 can be accessed from the outside via a door 55. In an embodiment, the storage compartment 53 can be accessible from inside and outside the lavatory. For example, the door for changing the paper towels or taking out the trash receptacle can be on the outside, while the paper towels and trash receptacle are usable inside. The storage compartment 53 can be used for lavatory provisions, crew emergency equipment, a closet or for other storage. As shown in FIG. 16, in another embodiment, lavatory monument assembly 112 includes a door 44 that allows access from the outside to amenities on the inside of the lavatory. For example, as shown in FIG. 16, this can allow the toilet paper roll (or rolls) to be changed from outside. This lavatory monument assembly 10 would likely be used in an area or an aircraft that is not adjacent an exit door, thereby obviating the need for the flight attendant assist space 36. However, this lavatory monument assembly can also be positioned next to an exit door.

It will be appreciated that in an embodiment where lavatory monument assembly 112 is modular, any or all of sink module 42, mirror module 46, toilet module 84, ceiling module 86 and door module 88 are compatible with the outer shell 116 of lavatory monument assembly 112, just as they are compatible with the outer shell 80 of lavatory monument assembly 10.

Figure 17:
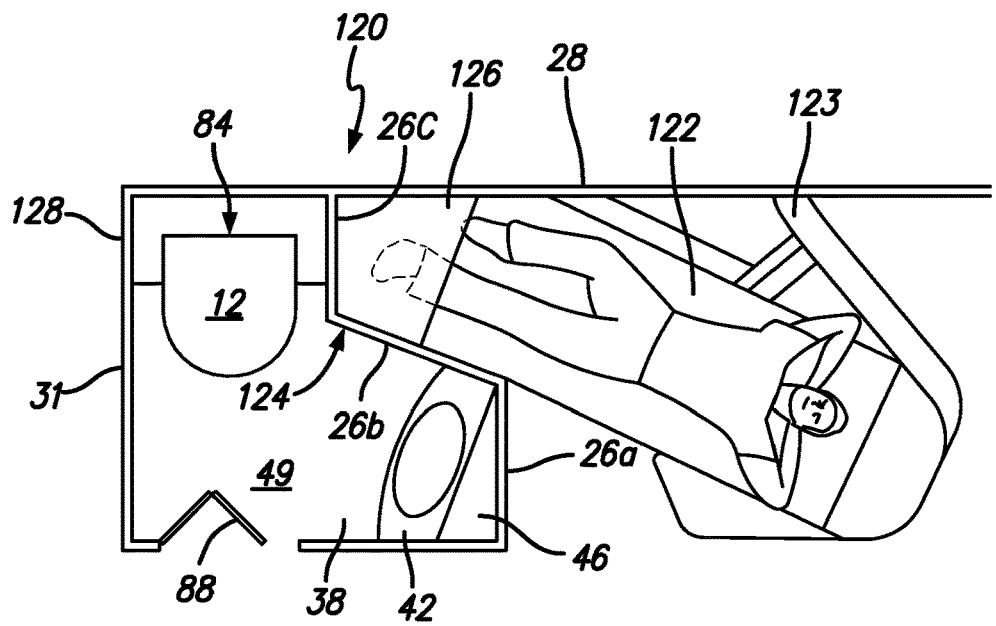
FIG. 17 is a top plan view a lavatory monument assembly unitary with the seat shell of a business class seat in accordance with another preferred embodiment of the present invention.
Figure 18:
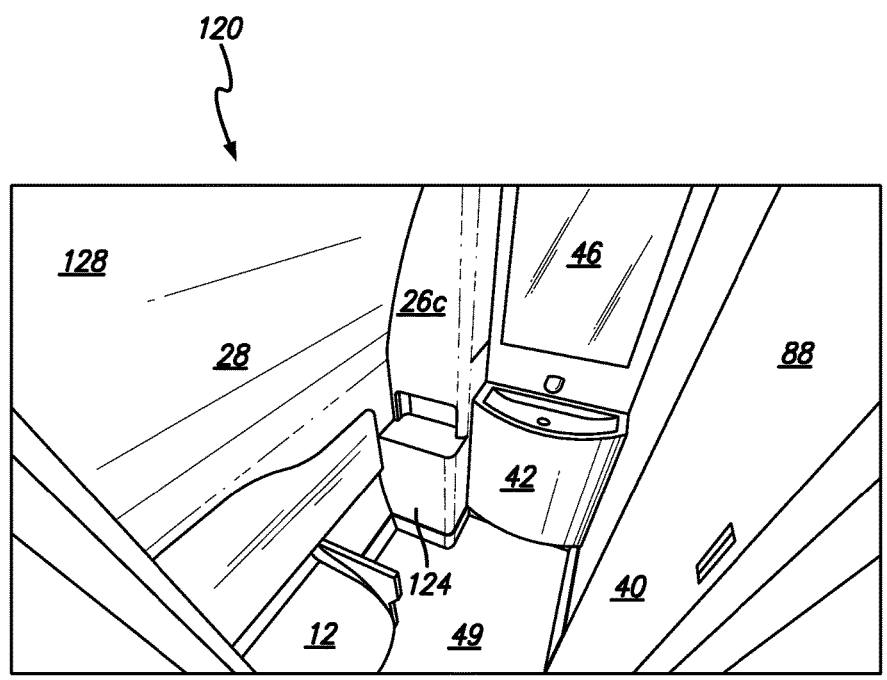
FIG. 18 is an inside perspective view of the lavatory monument assembly of FIG. 16.

FIGS. 17-18 show another embodiment of a lavatory monument assembly 120 where it is positioned adjacent, secured to or unitary with a lie flat bed/seat 122 in business or first class. This scenario may happen, for example, in the front row of an aircraft with a lavatory monument forward thereof. In this embodiment, the space created by alcove 38 can be used for a seat to recline or for the foot portion of a bed. This can also be used in coach class where a regular seat can recline into the space created by the alcove 38. FIG. 17, shows the lavatory monument assembly 120 unitary with seat shell 123 of the business class seat. As shown, in a preferred embodiment, first wall 28 is extended and is secured to or unitary with the seat shell 123. As shown in FIG. 17, the second portion 26b of wall 26 can be angled to provide more space in alcove 38. However, this is not a limitation on the invention. In FIG. 18, the second portion 26b of wall 26 is not angled and neither is the sink module 42.

In a preferred embodiment, the fourth wall 26 includes a foot recess 124 defined therein. As shown in FIG. 18, the recess extends into the lavatory interior 49. The recess can include a top wall 126 that can serve as a counter for the passenger in the seat adjacent thereto.

It will be appreciated that in an embodiment where lavatory monument assembly 120 is modular, any or all of sink module 42, mirror module 46, toilet module 84, ceiling module 86 and door module 88 are compatible with the outer shell 128 of lavatory monument assembly 120, just as they are compatible with the outer shell 80 of lavatory monument assembly 10 or the outer shell 116 of lavatory monument assembly 112.

Figure 19:
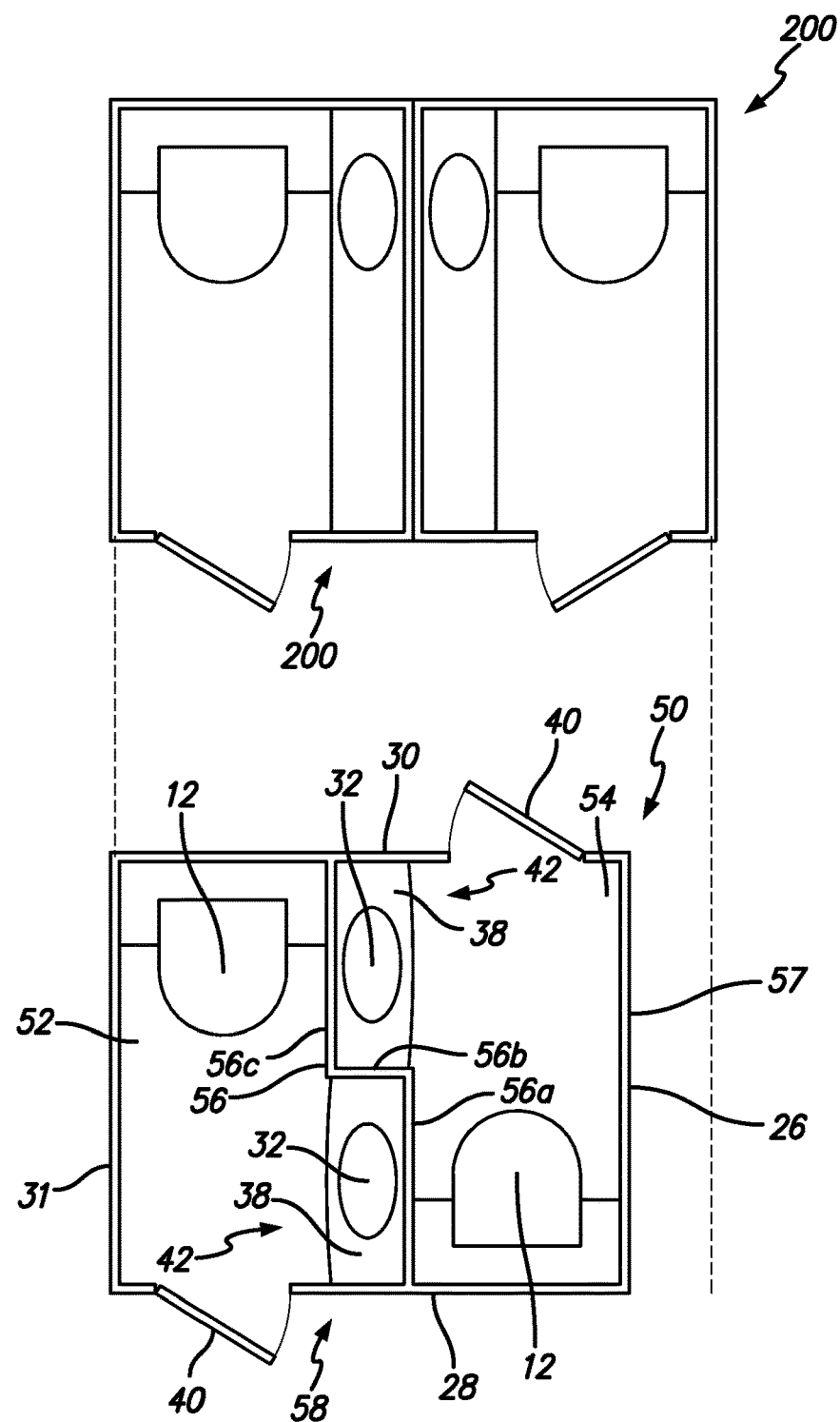
FIG. 19 is a top plan view of a comparison between a pair of prior art aircraft center lavatories and a dual lavatory monument assembly in accordance with another preferred embodiment of the present invention.

FIG. 19 shows a dual lavatory monument assembly 50 that includes first, second, third and fourth walls 28, 30, 31 and 26 that cooperate to form an outer shell 57 that defines an interior, and a fifth 56 wall that divides the interior into first and second lavatories 52 and 54 that share wall 56 (with first portion 56a, second portion 56b and third portion 56c). In a preferred embodiment, the first portion 56a is connected to the first wall 28, the third portion 56c is connected to the second wall 30, and the second portion 56b extends between and is not parallel with the first and third portions 56a and 56c. The outer shell 57 includes two alcoves 38.

As shown in FIG. 19, in a preferred embodiment, the dual lavatory monument assembly 50 (which will typically be used as a center lavatory) provides extra space, compared to the side by side conventional lavatories 200. The two alcoves 38 of the adjacent lavatories 52 and 54 essentially create interlocking lavatories where the sink modules 42 are positioned adjacent one another and define an alcove strip 58. As will be appreciated, by forming the outer shell 57 as shown in FIG. 19, the overall width (forward to aft or inboard to outboard) of the two lavatories can be reduced, compared to the prior art, which provides space for extra seats, which, as is described above, is desirable in aircraft. It will be appreciated that in an embodiment of dual lavatory monument assembly 50 that is modular, any or all of sink module 42, mirror module 46, toilet module 84, ceiling module 86 and door module 88 are compatible with the outer shell 57 (which preferably includes wall 56), just as they are compatible with the outer shell 80 of lavatory monument assembly 10 or the outer shell 116 of lavatory monument assembly 112 or the outer shell 128 of lavatory monument assembly 120.

Figure 20:
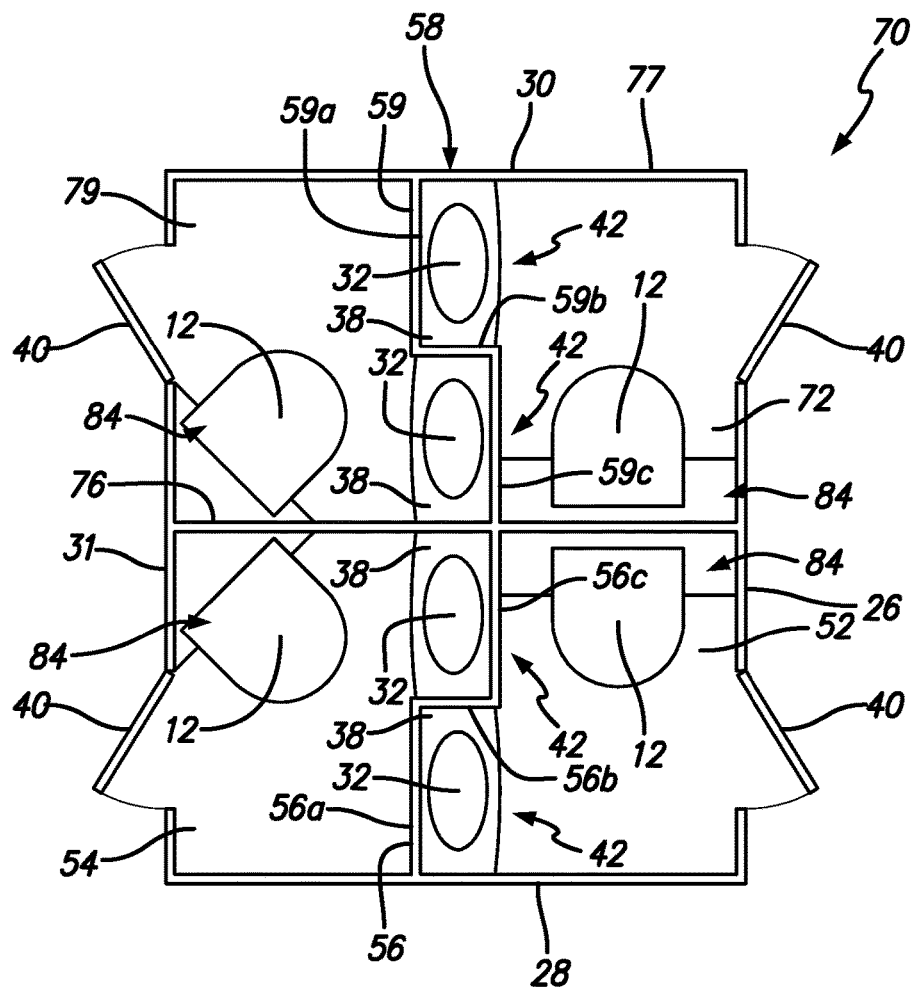
FIG. 20 is a top plan view of a quad lavatory monument assembly in accordance with another preferred embodiment of the present invention.
Figure 21:
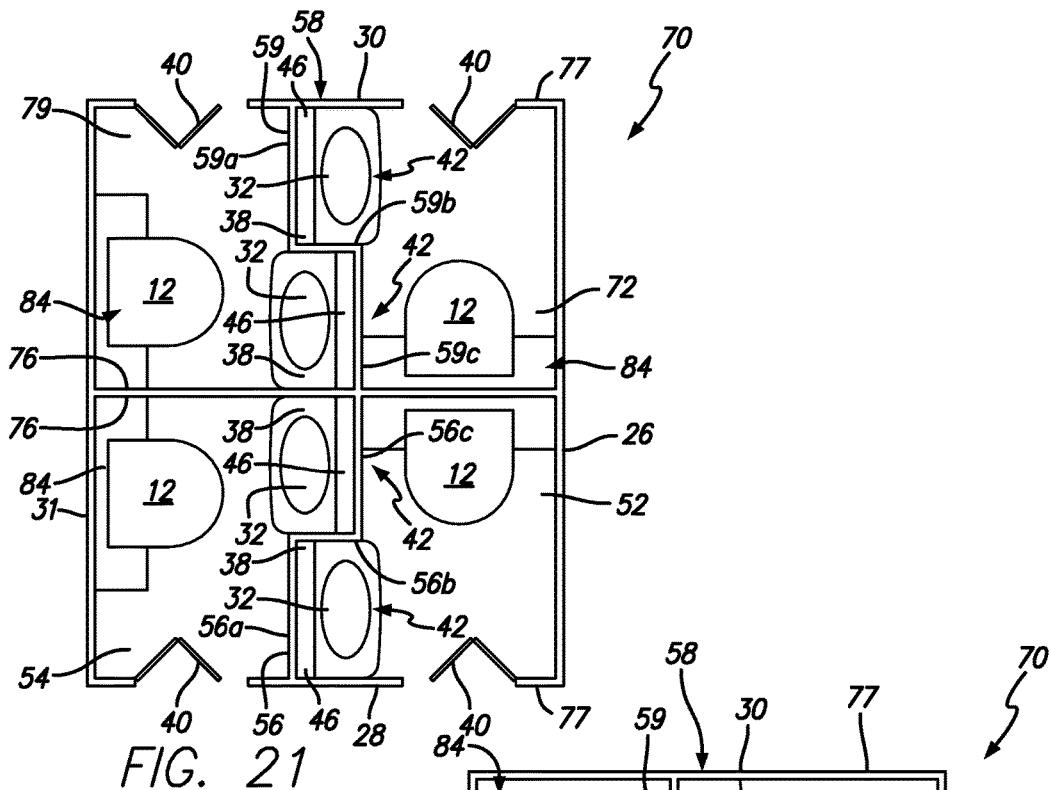
FIG. 21 is a top plan view of another quad lavatory monument assembly in accordance with a preferred embodiment of the present invention.
Figure 22:
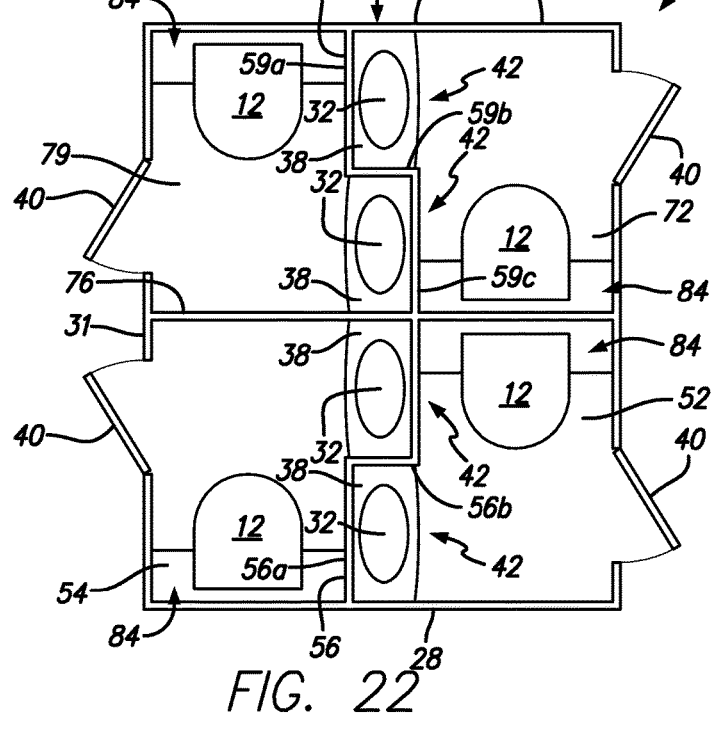
FIG. 22 is a top plan view of a another quad lavatory monument assembly in accordance with a preferred embodiment of the present invention.

FIGS. 20-22 show different layouts of a quad lavatory monument assembly 70 that includes first, second, third and fourth lavatories 52, 54, 72 and 74. The quad lavatory monument assembly 70 includes first, second, third and fourth walls 28, 30, 31 and 26 that cooperate to form an outer shell 77 that defines an interior, and fifth 56, sixth 59 and seventh 76 walls that divide the interior into the first, second, third and fourth lavatories 52, 54, 72 and 74. Fifth wall 56 includes first portion 56a, second portion 56b and third portion 56c. Sixth wall 59 includes first portion 59a, second portion 59b and third portion 59c. For the fifth wall, in a preferred embodiment, the first portion 56a is connected to the first wall 28, the third portion 56c is connected to the seventh wall 76, and the second portion 56b extends between and is not parallel with the first and third portions 56a and 56c. For the sixth wall 59, in a preferred embodiment, the first portion 59a is connected to the second wall 30, the third portion 59c is connected to the seventh wall 76, and the second portion 59b extends between and is not parallel with the first and third portions 59a and 59c. The outer shell 77 includes four alcoves 38. In a preferred embodiment, as shown in FIGS. 20-22, the first portion 56a of fifth wall 56 is co-planar and parallel to the first portion 59a of sixth wall 59, and the third portion 56c of fifth wall 56 is co-planar and parallel to the third portion 59c of sixth wall 59. Furthermore, the second portions 56b and 59b of the fifth and sixth walls 56 and 59 are parallel and not co-planar.

As is shown in FIGS. 20-22, the lavatories can include angled seats (as described above), seats that face inboard, outboard, forward or aft. In this embodiment, the alcoves 38 are positioned adjacent one another and define an alcove strip 58. The alcove strip 58 spans the interior between the first and second walls 28 and 30. The adjacent positioning of the sink modules 42 and mirror modules 46 provide the opportunity for sharing components, such as water heaters or filters, etc. It will be appreciated that in an embodiment of quad lavatory monument assembly 70 that is modular, any or all of sink module 42, mirror module 46, toilet module 84, ceiling module 86 and door module 88 are compatible with the outer shell 77 (which preferably includes walls 56, 59 and 76), just as they are compatible with the outer shell 80 of lavatory monument assembly 10, the outer shell 116 of lavatory monument assembly 112, the outer shell 128 of lavatory monument assembly 120 or the outer shell or the outer shell 57 of lavatory monument assembly 50.

In a preferred embodiment, within the modular lavatory system, the alcove 38 is always approximately the same size depth and width (height may vary), thereby allowing the sink module 42 and mirror module 46 to fit in any sized lavatory monument assembly. Furthermore, the shroud 106 of the toilet module 84 may vary in width to fit different sized lavatory monument assemblies. However, in a preferred embodiment, each lavatory monument assembly is equipped with common sized brackets for mounting the shroud 106. Therefore, the lavatory monument assemblies can have variable widths or depths, but each have a common sized alcove for removably mounting the sink and mirror modules therein and common brackets for mounting the toilet module. This allows flexibility in monument size, but provides commonality for mounting the sink, mirror and toilet modules in different monuments and commonality when replacing modules within a monument. As used herein, removably mounted or removably mounting means that a module can be disconnected from the outer shell and replaced with a similar module (or the same module) using common mounting components and common interfaces (e.g., for hooking up water, electricity, plumbing and the like)

Figure 23A:
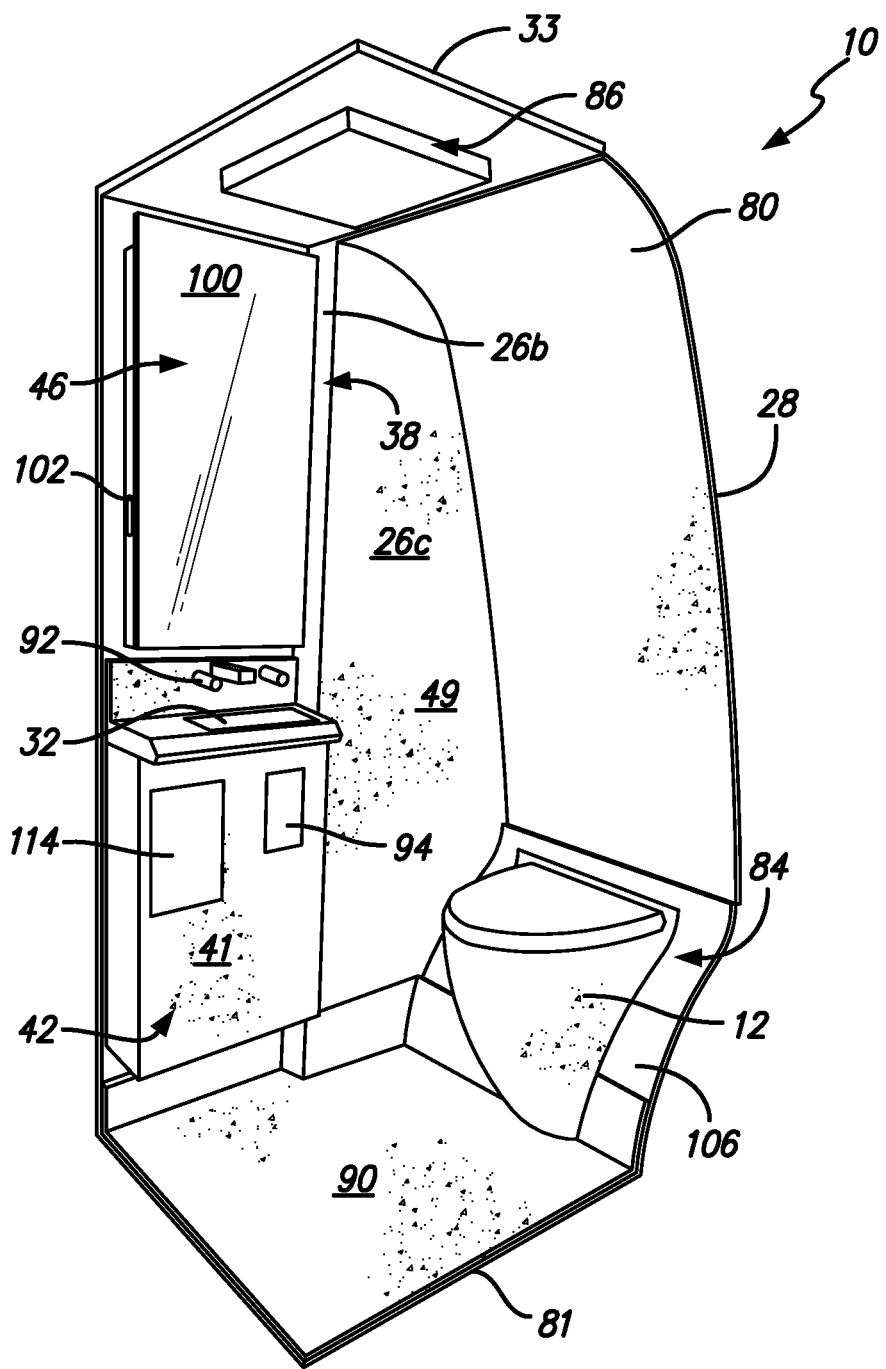
FIG. 23A is a perspective view of the modular lavatory monument assembly of FIG. 10 after it has been in use and has become dirty.
Figure 23B:
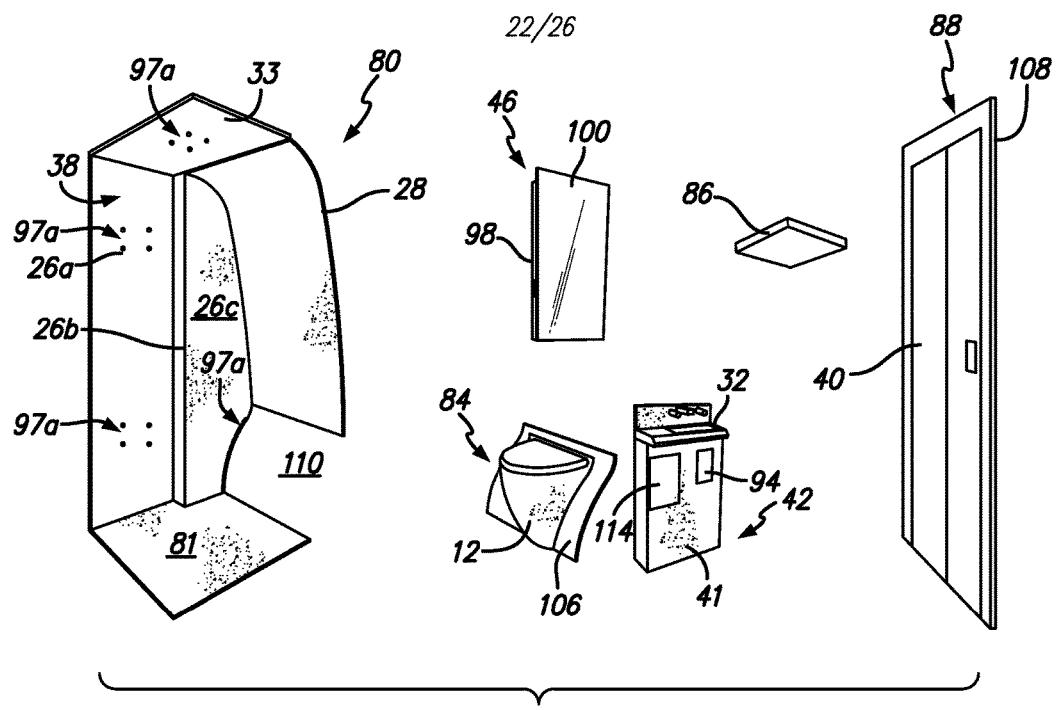
FIG. 23B is a perspective view of the modular lavatory monument assembly of FIG. 23A with the modules outside of the outer shell so the outer shell and modules can be cleaned.
Figure 23C:
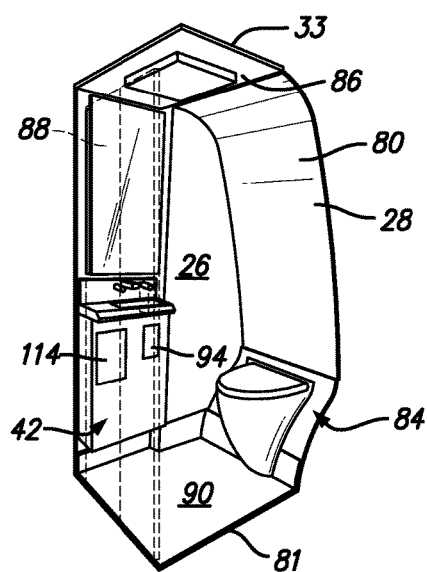
FIG. 23C is a perspective view of the modular lavatory monument assembly of FIG. 23A after it has been reassembled post cleaning.

The modularity of the lavatory monument assemblies described herein also provides other advantages for airlines or other users of the modular lavatory system. Typically, after a number of years of use a conventional lavatory is removed, scrapped and replaced with a new conventional lavatory. FIG. 23A depicts a dirty lavatory monument assembly 10. FIGS. 23B-23C show how the modular lavatory system provides the ability to remove the modules (e.g., any or all of sink module 42, mirror module 46, toilet module 84, ceiling module 86 and door module 88), clean the outer shell 80 and modules separately, and reinstall the modules after cleaning. FIG. 23B shows the outer shell 80, sink module 42, mirror module 46, toilet module 84, ceiling module 86 and door module 88 separate from one another and ready to be cleaned and FIG. 23C shows the lavatory monument assembly 10 reassembled with clean components. In another embodiment, the outer shell 80 can be cleaned and new modules can be installed. This provides the opportunity to provide new modules or upgraded modules, upgraded wall décor, etc. The mounting system also enables the installation of new modules. For example, the old sink module 42 and the new sink module 42 have similar mounting components 97b thereon that both mate with the mounting components 97a on the outer shell 80.

Figure 24A:
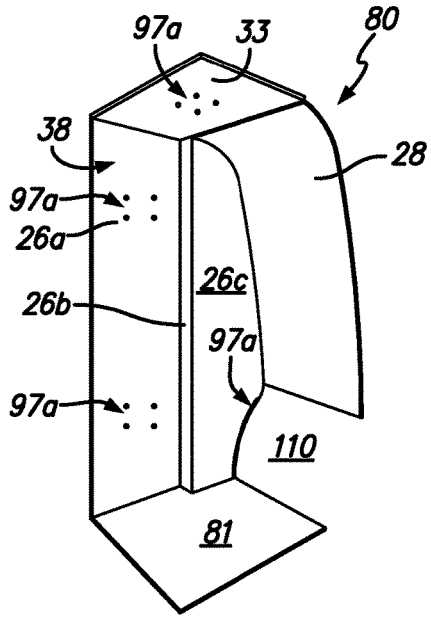
FIG. 24A is a perspective view of a modular lavatory monument assembly outer shell after removal of the modules.
Figure 24B:
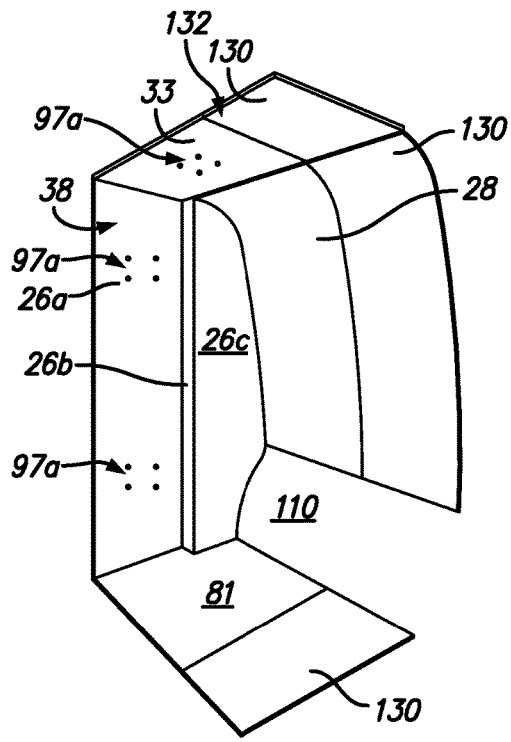
FIG. 24B is a perspective view of the modular lavatory monument assembly outer shell of FIG. 24A after extensions have been added.
Figure 24C:
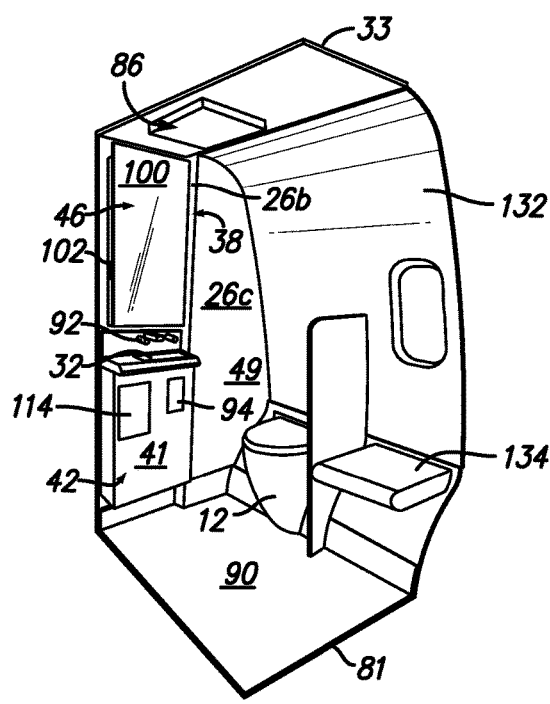
FIG. 24C is a perspective view of the modular lavatory monument assembly outer shell of FIG. 24B after the modules have been positioned therein.

FIGS. 24A-24C show another exemplary embodiment of the lavatory monument system and the ability to upgrade to a larger lavatory without needing to purchase a new one. This may be advantageous in a scenario wherein a smaller lavatory (e.g., lavatory monument assembly 10) was originally installed in an aircraft, but the airline later desires to change to a larger size. FIG. 24A shows the outer shell 80 after removal of the original modules therein (e.g., sink module 42, mirror module 46, toilet module 84, ceiling module 86 and door module 88). As shown in FIG. 24B, extensions 130 can be added to the floor 81, the first wall 28 and the ceiling. In this example, an extension is also added to second wall 30, not shown. The extensions 130 together with the first through fourth walls comprise a new outer shell 132 into which the original modules, new modules or some new and some old can be installed, as shown in FIG. 24C. The extra space can be used as desired. FIG. 24C shows an exemplary seat or baby changing table 134 that can be added. In another embodiment, the size of the lavatory can be reduced.

Figure 25:
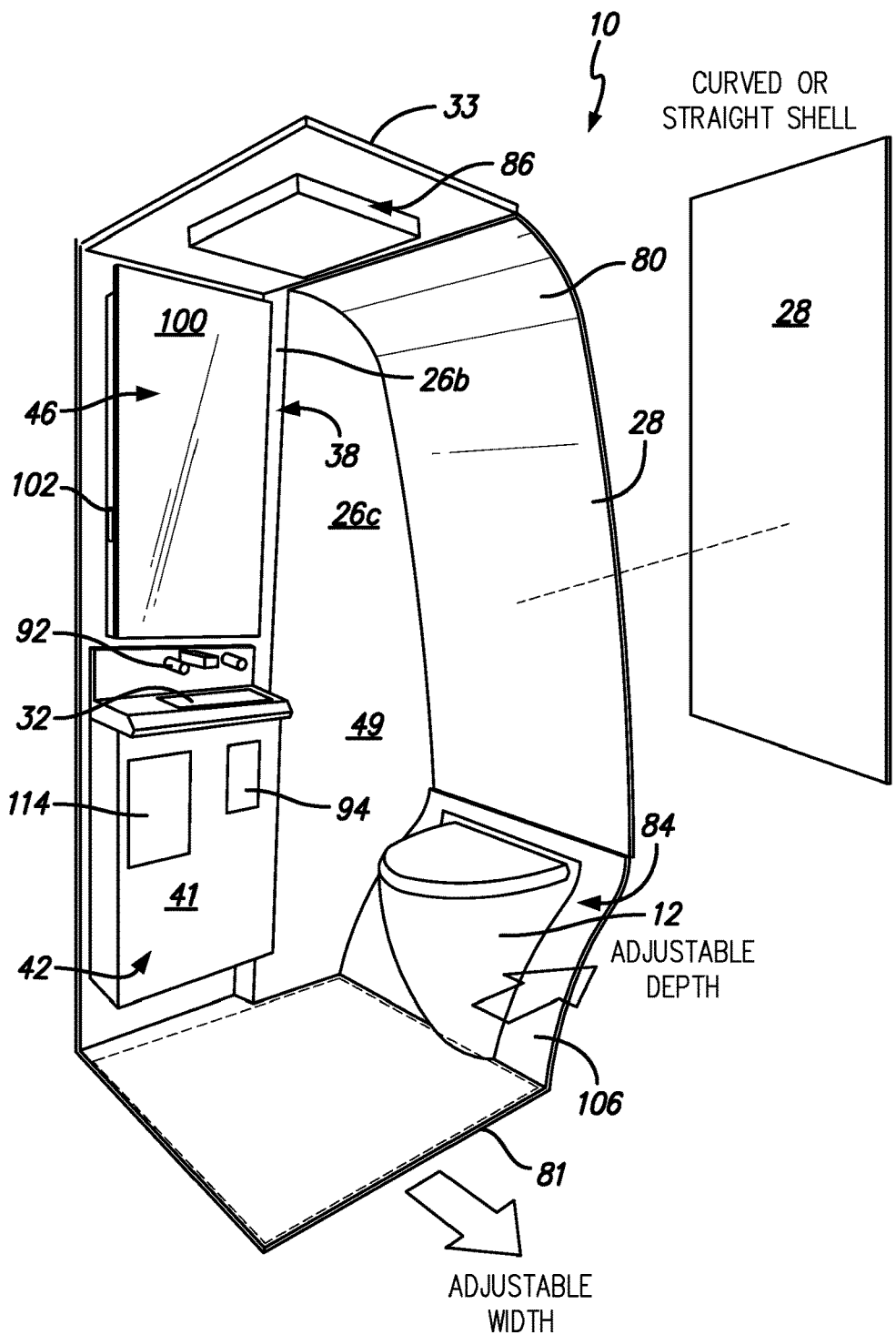
FIG. 25 is a perspective view of a modular lavatory monument assembly and showing the enlargement and modification possibilities.

FIG. 25 shows some of the advantages provided by the modular lavatory system, such as adjustable width, adjustable depth and the ability to add a curved or straight first wall 28 (or any other wall) depending on the positioning in an aircraft, desired lavatory size or other needs dictated by positioning. The alcoves of different outer shells preferably receive a common width sink module therein and a common width mirror module therein. It will be appreciated that the modular lavatory system provided herein allows the lavatory monument to be sizable to fit within an aircraft and provide the best seating arrangement options (i.e., number and positioning of seats) instead of having the seating arrangement have to be designed around the size of the lavatories. This is possible because generally, the outer shell is a customizable "box" into which a "standardized" module can be fitted.

Figure 26:
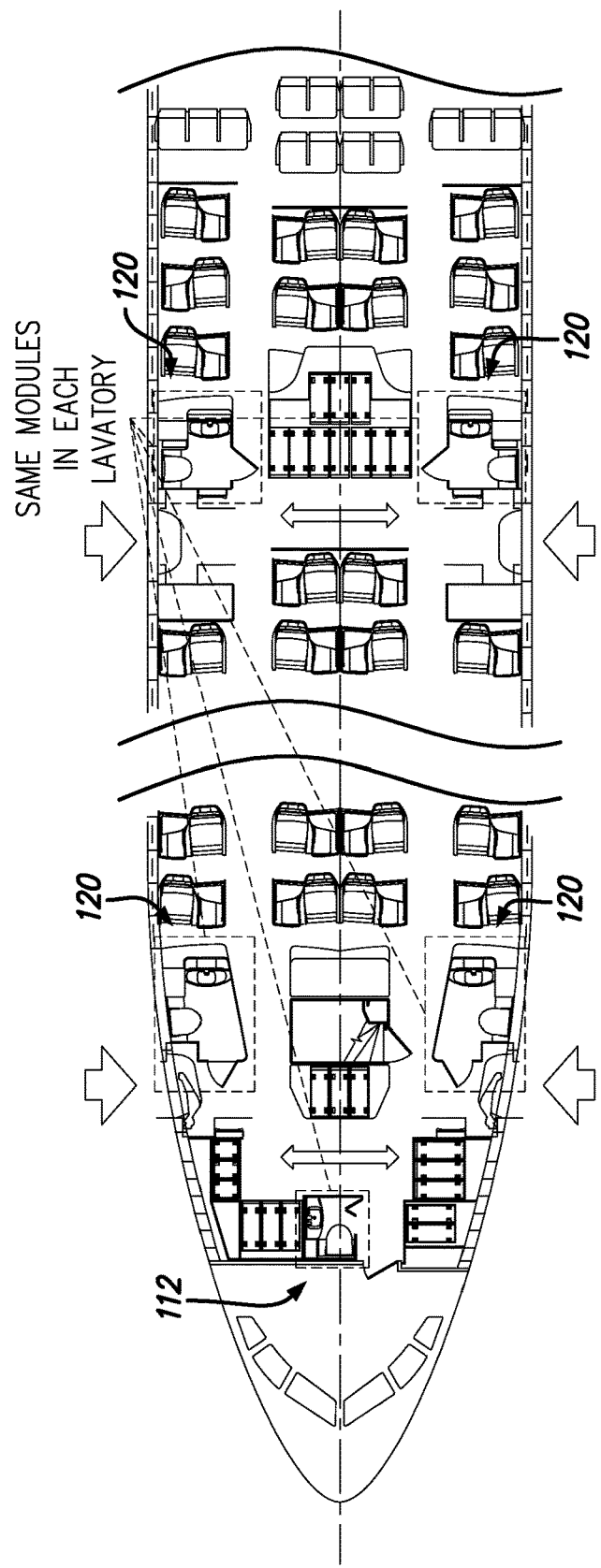
FIG. 26 is a plan view of the forward portion of an aircraft with a plurality of lavatory monument assemblies therein.
Figure 27:
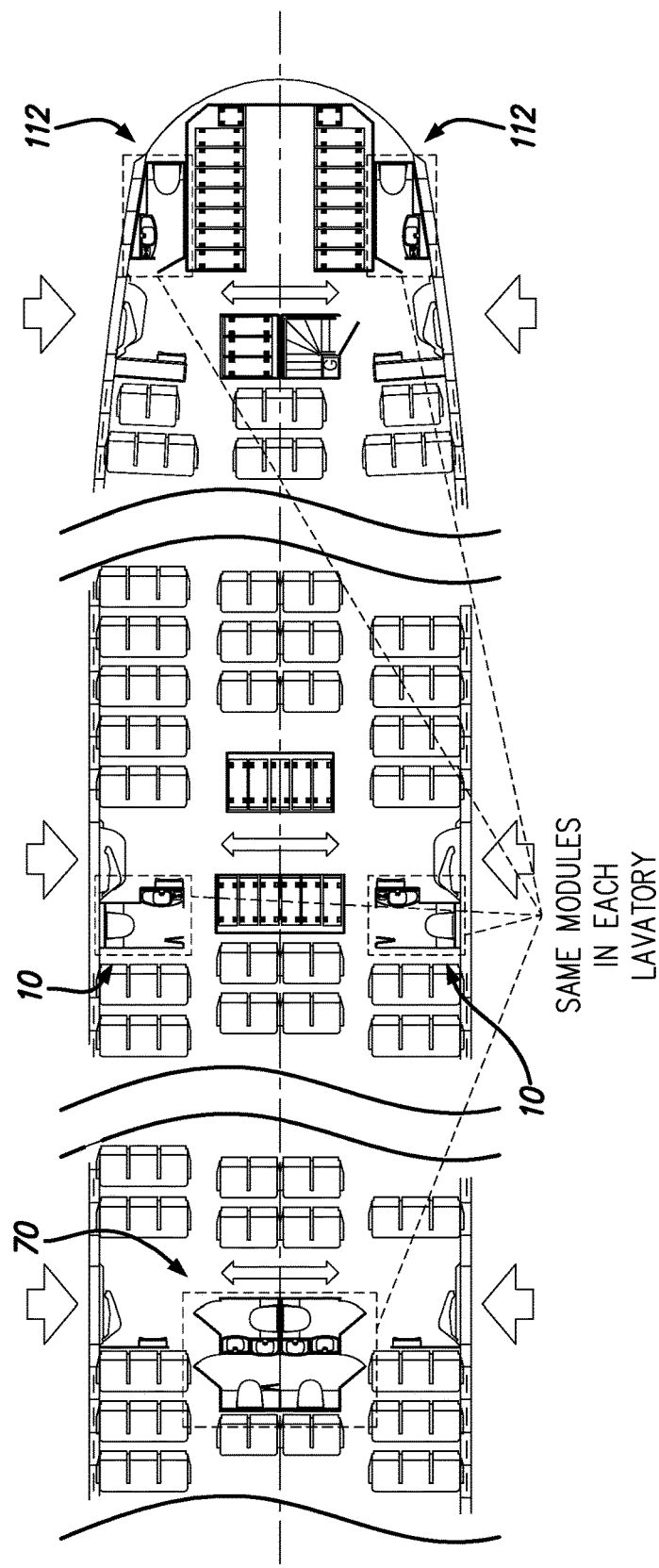
FIG. 27 is a plan view of the aft portion of the same aircraft as FIG. 26 with a plurality of lavatory monument assemblies therein.

FIGS. 26-27 show a plan view of an exemplary aircraft layout with a number of modular lavatory monument assemblies having an alcove therein. FIG. 26 shows the forward portion of the aircraft and FIG. 27 shows the aft portion of the aircraft. As can be seen, there are a number of different shaped and sized lavatory monument assemblies 10, 112, 120 and 70 therein, that each include an outer shell 80, 116, 128 and 77. However, within the outer shells of each lavatory monument assembly are common sink modules 42 and mirror modules 46 (and other modules) positioned within the alcoves 38. FIG. 27 shows the aftmost lavatory monument assemblies 112 with storage compartments 58 and alcoves 38 that have a non-rectangular cross-section in plan view.

In an exemplary embodiment, the modules include the following components. The sink module 32 includes a sink cabinet, a faucet, a sink bowl and counter, a waste compartment, a water supply system, a toilet paper dispensing unit and a set of mounting components thereon. The mirror module includes a mirror cabinet, a mirror, a paper towel dispensing unit, a flight attendant call button, and a set of mounting components thereon. The toilet module includes a shroud, a toilet bowl, a seat, a lid and mounting components thereon. The door module includes a frame and a door. The ceiling module includes a housing, an oxygen generator, at least one oxygen mask, a speaker, a smoke detector and a set of mounting components thereon.

In a preferred embodiment, the invention includes a method of providing first and second identically sized sink modules, providing first and second differently sized outer shells (e.g., different inner volumes) that each include an alcove, and positioning the first sink modules in the alcove of the first outer shell and the second sink module in the alcove of the second outer shell to create first and second lavatory monument assemblies. For example, the first sink module can be positioned in lavatory monument assembly 10 and the second sink module can be positioned in lavatory monument assembly 120 or vice versa. The method also includes providing first and second identically sized mirror modules and positioning the first mirror module in the alcove of the first outer shell and the second sink module in the alcove of the second outer shell. In a preferred embodiment, the first outer shell includes a sink mounting system therein and the second outer shell includes an identical sink mounting system therein. This allows the first and second sink modules to be positioned in either of the different first and second outer shells.

In a preferred embodiment, the present invention also includes a system for assembling lavatory monument assemblies (e.g., an assembly line). The system includes providing at least first and second (and preferably more) differently sized outer shells that each include an alcove therein. Providing a plurality of sink modules and a plurality of mirror modules and positioning a sink module and mirror module in the alcove of each outer shell. Generally, the present invention provides an adjustably sized outer shell with standard sized modules positioned therein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will include the words "means for.") Accordingly, the applicant reserves the right to add additional claims after filing the application to pursue such additional claim forms for other aspects of the disclosure.

Although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A modular dual lavatory monument assembly configured to be positioned in the interior of an aircraft, the modular lavatory monument assembly comprising:

first, second, third and fourth walls that cooperate to form an outer shell that defines an interior, and a fifth wall that divides the interior into first and second lavatories, wherein the outer shell includes first and second alcoves that extend between the first and second walls to form an alcove strip,
a first sink module positioned in the first alcove,
a first mirror module positioned above the first sink module in the first alcove,
a first door positioned on one of the first or third walls,
a second sink module positioned in the second alcove,
a second mirror module positioned above the second sink module in the second alcove,
a second door positioned on one of the second or fourth walls, and
a first toilet module positioned adjacent the second wall and a second toilet module positioned adjacent the first wall.

2. The modular dual lavatory monument assembly of claim 1 wherein the fifth wall includes first, second and third portions, wherein the first portion is connected to the first wall, the third portion is connected to the second wall, and the second portion extends between and is not parallel with the first and third portions, wherein the first alcove is defined in the first lavatory between the first wall and the third portion of the fifth wall and the second alcove is defined in the second lavatory between the second wall and the third portion of the fifth wall.

3. The modular dual lavatory monument assembly of claim 1 wherein the first and second sink modules face in opposite directions.

4. The dual modular lavatory monument assembly of claim 1 wherein the outer shell includes a floor and the first and second alcoves extend from the floor to the top of the fourth wall.

5. The dual modular lavatory monument assembly of claim 4 wherein the outer shell includes a ceiling, and wherein the first and second alcoves extend from the floor to the ceiling.

6. The dual modular lavatory monument assembly of claim 1 wherein the first and second sink modules each include a sink cabinet, a faucet, a sink bowl, a counter, a waste compartment, a water supply system, a toilet paper dispensing unit and a set of mounting components on the sink cabinet that are removably mounted to associated mounting components in the first and second alcoves, respectively.

7. The dual modular lavatory monument assembly of claim 1 wherein the first and second mirror modules each include a mirror cabinet, a mirror, a paper towel dispensing unit, a flight attendant call button, and a set of mounting components on the mirror cabinet that are removably mounted to associated mounting components in the first and second alcoves, respectively.

8. The dual modular lavatory monument assembly of claim 1 wherein the first and second toilet modules each include a shroud, a toilet bowl, a seat and a lid, wherein the shrouds each include mounting components thereon that are removably secured to mounting components on at least two of the first, second, third, fourth and fifth walls.

9. The dual modular lavatory monument assembly of claim 1 further comprising a ceiling module positioned in the lavatory interior, wherein the ceiling module includes a housing and at least one of an oxygen generator, at least one oxygen mask, a speaker and a smoke detector, and wherein the housing includes a set of mounting components on the housing that are removably mounted to associated mounting components associated with the outer shell.

10. A method of assembling a dual modular lavatory monument assembly configured to be positioned in the interior of an aircraft, the method comprising the steps of:
providing a first outer shell that includes first, second, third and fourth walls that cooperate to define an interior, and a fifth wall that divides the interior into first and second lavatories, wherein the outer shell includes first and second alcoves that extend between the first and second walls, wherein a first door is positioned on one of the first or third walls, and wherein a second door is positioned on one of the second or fourth walls,
removably securing a first sink module in the first alcove,
removably securing a first mirror module above the first sink module in the first alcove,
removably securing a second sink module in the second alcove,
removably securing a second mirror module above the second sink module in the second alcove,
removably securing a first toilet module to one or more of the first, third, fourth or fifth walls, wherein the first toilet module does not contact the first sink module, and
removably securing a second toilet module to one or more of the second, third, fourth or fifth walls, wherein the second toilet module does not contact the second sink module.

11. The method of claim 10 wherein both the first sink module and the second sink module include a sink cabinet, a faucet, a sink bowl, a counter, a waste compartment, a water supply system, a toilet paper dispensing unit and a set of mounting components on the sink cabinet that are removably mounted to associated mounting components in the first and second alcoves, respectively.

12. The method of claim 10 further comprising the steps of removing the first sink module, first mirror module and first toilet module from the first lavatory, cleaning the outer shell, removably securing the first sink module in the first alcove a second time, removably securing the first toilet within the first lavatory a second time, and removably securing the first mirror module above the first sink module in the first alcove a second time.

13. The method of claim 10 further comprising the steps of removing the first sink module, first mirror module and first toilet module from the first lavatory, cleaning the outer shell, removably securing a third sink module in the first alcove, removably securing a third toilet module to one or more of the first, third, fourth or fifth walls, and removably securing a third mirror module above the third sink module in the first alcove.

14. The method of claim 10 wherein the fifth wall includes first, second and third portions, wherein the first portion is connected to the first wall, the third portion is connected to the second wall, and the second portion extends between and is not parallel with the first and third portions, wherein the first alcove is defined in the first lavatory between the first wall and the third portion of the fifth wall and the second alcove is defined in the second lavatory between the second wall and the third portion of the fifth.

15. A method of assembling a dual modular lavatory monument assembly configured to be positioned in the interior of an aircraft, the method comprising the steps of:
providing a first outer shell that includes first, second, third and fourth walls that cooperate to define an interior, and a fifth wall that divides the interior into first and second lavatories, wherein the outer shell includes first and second alcoves that extend between the first and second walls, wherein a first door is positioned on one of the first or third walls, and wherein a second door is positioned on one of the second or fourth walls, removably securing a first sink module in the first alcove, removably securing a first mirror module above the first sink module in the first alcove, removably securing a second sink module in the second alcove, removably securing a second mirror module above the second sink module in the second alcove, and removing the first sink module from the alcove and lavatory interior, and removably securing a third sink module in the first alcove.

16. The method of claim 15 wherein the third sink module includes a sink cabinet, a faucet, a sink bowl, a counter, a waste compartment, a water supply system, a toilet paper dispensing unit and a set of mounting components on the sink cabinet that are removably mounted to associated mounting components in the first alcove.

17. A dual lavatory monument assembly configured to be positioned in the interior of an aircraft, the lavatory monument assembly comprising:

first, second, third and fourth walls that cooperate to form an outer shell that defines an interior, and a fifth wall that divides the interior into first and second lavatories, wherein the outer shell includes first and second alcoves that extend between the first and second walls to form an alcove strip, wherein the fifth wall includes first, second and third portions, wherein the first portion is connected to the first wall, the third portion is connected to the second wall, and the second portion extends between and is not parallel with the first and third portions, and wherein the first alcove is defined in the first lavatory between the first wall and the third portion of the fifth wall and the second alcove is defined in the second lavatory between the second wall and the third portion of the fifth wall, a first sink positioned in the first alcove, a first mirror positioned above the first sink in the first alcove, a first door positioned on one of the first or third walls, a second sink positioned in the second alcove, a second mirror positioned above the second sink in the second alcove, a second door positioned on one of the second or fourth walls, and a first toilet positioned adjacent the second wall and a second toilet positioned adjacent the first wall.

18. The dual lavatory monument assembly of claim 17 wherein the first and second sinks face in opposite directions.

* * * * *